US010575007B2

(12) United States Patent
Sun et al.

(10) Patent No.: US 10,575,007 B2
(45) Date of Patent: *Feb. 25, 2020

(54) EFFICIENT DECODING AND RENDERING OF BLOCKS IN A GRAPHICS PIPELINE

(71) Applicant: Microsoft Technology Licensing, LLC, Redmond, WA (US)

(72) Inventors: Guosheng Sun, San Jose, CA (US); Olof L. E. Mases, Sunnyvale, CA (US); Lihua Zhu, Mountain View, CA (US); B. Anil Kumar, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/097,143

(22) Filed: Apr. 12, 2016

(65) Prior Publication Data

US 2017/0295379 A1    Oct. 12, 2017

(51) Int. Cl.
*H04N 7/12* (2006.01)
*H04N 19/44* (2014.01)
(Continued)

(52) U.S. Cl.
CPC .......... *H04N 19/44* (2014.11); *G06T 15/005* (2013.01); *G06T 15/04* (2013.01); *H04N 19/436* (2014.11)

(58) Field of Classification Search
CPC ....... G06T 11/40; G06T 15/50; G06T 15/005; G06T 15/04; H04N 19/44; H04N 19/159; H04N 19/436
(Continued)

(56) References Cited

U.S. PATENT DOCUMENTS 5,778,098 A    7/1998  Lee et al.
7,362,804 B2   4/2008  Novotny et al.
(Continued)

FOREIGN PATENT DOCUMENTS

CN    101123723    2/2008
CN    102254297    11/2013
(Continued)

OTHER PUBLICATIONS

Anonymous, "Point Sprites (Direct3D 9)," downloaded from the World Wide Web on Apr. 12, 2016, 3 pp.
(Continued)

*Primary Examiner* — Gims S Philippe
(74) *Attorney, Agent, or Firm* — Klarquist Sparkman, LLP

(57) ABSTRACT

Innovations in video decoding and rendering operations in a graphics pipeline, in which at least some of the operations are performed using a graphics processing unit ("GPU"), are described. For example, a video playback tool aggregates texture values for intra-coded blocks of a picture in central processing unit ("CPU") memory, then transfers the texture values for the intra-coded blocks from the CPU memory to GPU memory. The video playback tool performs operations to decode the encoded data and reconstruct the picture. For a given block (e.g., of a macroblock, coding unit) of the picture, a graphics primitive represents texture values for the given block as a point for processing by the GPU. The video playback tool uses one or more shader routines, executable by the GPU, to transfer texture values to a display buffer. In some cases, the video playback tool also performs decoding operations with the shader routines.

20 Claims, 14 Drawing Sheets

(51) Int. Cl.
  *G06T 15/04* (2011.01)
  *G06T 15/00* (2011.01)
  *H04N 19/436* (2014.01)

(58) Field of Classification Search
  USPC .......... 375/240.25, 240.29, 240.12; 345/420, 345/426
  See application file for complete search history.

(56) References Cited

U.S. PATENT DOCUMENTS

| | | | |
|---|---|---|---|
| 7,565,021 | B2 | 7/2009 | Feng et al. |
| 7,646,815 | B2 | 1/2010 | Dattani et al. |
| 7,646,817 | B2 * | 1/2010 | Shen .................. H04N 19/159 375/240.25 |
| 7,885,336 | B2 | 2/2011 | Wong et al. |
| 8,074,248 | B2 | 12/2011 | Sigmon, Jr. et al. |
| 8,180,165 | B2 | 5/2012 | Lu et al. |
| 8,233,527 | B2 | 7/2012 | Schmit et al. |
| 8,363,730 | B2 | 1/2013 | Saxena et al. |
| 8,411,734 | B2 | 4/2013 | Zhao et al. |
| 8,457,434 | B2 | 6/2013 | Zhu et al. |
| 8,542,745 | B2 | 9/2013 | Zhang et al. |
| 8,681,162 | B2 | 3/2014 | Paltashev et al. |
| 8,732,474 | B1 | 5/2014 | Perry et al. |
| 8,773,443 | B2 | 7/2014 | Diard |
| 8,804,831 | B2 | 8/2014 | Karczewicz et al. |
| 8,817,179 | B2 | 8/2014 | Zhu et al. |
| 8,913,068 | B1 | 12/2014 | Kokkevis et al. |
| 8,929,459 | B2 | 1/2015 | Massimino |
| 9,300,976 | B2 | 3/2016 | Fuldseth |
| 9,563,928 | B1 | 2/2017 | Sokolowski et al. |
| 9,563,929 | B1 | 2/2017 | Sokolowski et al. |
| 9,665,972 | B2 | 5/2017 | Block et al. |
| 9,710,509 | B2 | 7/2017 | Song et al. |
| 9,720,888 | B1 | 8/2017 | Jain et al. |
| 2004/0076333 | A1 | 4/2004 | Zhang et al. |
| 2004/0190617 | A1 | 9/2004 | Shen et al. |
| 2007/0018979 | A1 * | 1/2007 | Budagavi ................ G06T 15/50 345/426 |
| 2007/0291858 | A1 * | 12/2007 | Hussain .................. H04N 19/44 375/240.29 |
| 2008/0084932 | A1 | 4/2008 | Wang et al. |
| 2008/0273028 | A1 * | 11/2008 | Jiao .......................... G06T 11/40 345/420 |
| 2008/0310509 | A1 | 12/2008 | Goel |
| 2009/0002379 | A1 | 1/2009 | Baeza et al. |
| 2009/0110310 | A1 | 4/2009 | Kodama |
| 2009/0160865 | A1 | 6/2009 | Grossman |
| 2009/0305790 | A1 | 12/2009 | Lu et al. |
| 2010/0077058 | A1 | 3/2010 | Messer |
| 2010/0118038 | A1 | 5/2010 | Labour et al. |
| 2010/0135418 | A1 * | 6/2010 | Zhang .................... H04N 19/44 375/240.25 |
| 2010/0146523 | A1 | 6/2010 | Brigaut et al. |
| 2012/0092353 | A1 | 4/2012 | Paltashev et al. |
| 2012/0093214 | A1 | 4/2012 | Urbach |
| 2012/0031482 | A1 | 12/2012 | Abdo et al. |
| 2012/0317236 | A1 | 12/2012 | Abdo et al. |
| 2013/0044260 | A1 | 2/2013 | Vestergaard et al. |
| 2013/0044805 | A1 | 2/2013 | Vestergaard et al. |
| 2013/0047074 | A1 | 2/2013 | Vestergaard et al. |
| 2013/0051478 | A1 | 2/2013 | Wu et al. |
| 2013/0128966 | A1 | 5/2013 | Gao et al. |
| 2014/0053059 | A1 | 2/2014 | Weber et al. |
| 2014/0105272 | A1 | 4/2014 | Bulusu et al. |
| 2014/0192893 | A1 | 7/2014 | Sullivan et al. |
| 2014/0254671 | A1 | 9/2014 | Misra et al. |
| 2014/0368516 | A1 | 12/2014 | Taggart et al. |
| 2015/0023409 | A1 | 1/2015 | Schierl et al. |
| 2015/0110172 | A1 | 4/2015 | Ye et al. |
| 2015/0208084 | A1 | 7/2015 | Zhu et al. |
| 2017/0132178 | A1 | 5/2017 | Ramachandran |
| 2017/0300312 | A1 | 10/2017 | Aharon et al. |
| 2017/0372494 | A1 | 12/2017 | Zhu et al. |
| 2018/0063540 | A1 | 3/2018 | Zhu et al. |
| 2018/0091764 | A1 | 3/2018 | Aharon et al. |
| 2018/0103261 | A1 | 4/2018 | Sun et al. |
| 2018/0152699 | A1 | 5/2018 | Kumar et al. |
| 2018/0324238 | A1 | 11/2018 | Melenboim et al. |

FOREIGN PATENT DOCUMENTS

| | | |
|---|---|---|
| EP | 2034439 | 3/2009 |
| WO | WO 2007/093629 | 8/2007 |

OTHER PUBLICATIONS

Ebrahimi et al., "MPEG-4 Natural Video Coding—An overview," *Journal of Signal Processing: Image Communication*, vol. 15, No. 4-5, 33 pp. (Jan. 2000).

Munshi, "OES_point_sprite," https://www.khronos.org/registry/gles/extensions/OES/OES_point_sprite.txt, 6 pp. (2004).

Munshi et al., "OpenGL® ES Common Profile Specification 2.0.24 (Difference Specification)," 81 pp. (2009).

Cheung et al., "Highly Parallel Rate-Distortion Optimized Intra-Mode Decision on Multicore Graphics Processors," *IEEE Trans. on Circuits and Systems for Video Technology*, vol. 19, No. 11, pp. 1692-1703 (Nov. 2009).

Han et al., "Efficient Video Decoding on GPUs by Point Based Rendering," *Proc. ACM SIGGRAPH/Eurographics Symp. on Graphics Hardware*, PowerPoint presentation, 30 pp. (Sep. 2006).

Han et al., "Efficient Video Decoding on GPUs by Point Based Rendering," *Proc. ACM SIGGRAPH/Eurographics Symp. on Graphics Hardware*, 8 pp. (2006).

Hermans, "H.264/MPEG4 Advanced Video Coding," Seminar Report, Matriculation No. 284141 RWTH, 23 pp. (Sep. 2012).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

Kalva et al., "Parallel Programming for Multimedia Applications," *Multimedia Tools and Applications*, vol. 51, Issue 2, pp. 801-818 (Jan. 2011).

Kamp et al., "Multihypothesis Prediction using Decoder Side Motion Vector Derivation in Inter Frame Video Coding," *SPIE Visual Communications and Image Processing*, vol. 7257, 8 pp. (Jan. 2009).

Shen et al., "Accelerating Video Decoding Using GPU," *Int'l Conf. on Acoustics, Speech, and Signal Processing*, vol. 4, 4 pp. (Apr. 2003).

Sonnati, "H265—part I: Technical Overview,"*Video Encoding & Streaming Technologies*, 7 pp. (Jun. 2014).

W3C, "Web Workers," Editor's Draft, 27, Sep. 2016, 37 pp., downloaded from the World Wide Web on Oct. 10, 2016.

Web Hypertext Application Technology Working Group, "HTML Living Standard—Last Updated Oct. 10, 2016," Chapter 10, 43 pp., downloaded from the World Wide Web on Oct. 10, 2016.

Wikipedia, "Web Worker," 4 pp., downloaded from the World Wide Web on Oct. 10, 2016.

International Search Report and Written Opinion dated Oct. 25, 2017, from International Patent Application No. PCT/US2017/051967, 13 pp.

ISO/IEC, "Proposed Text for 14496-31 (VCB) CD," ISO/IEC JTC1/SC29/WG11 MPEG2014/M 33082, 95 pp. (Mar. 2014).

Notice of Allowance dated Apr. 12, 2018, from U.S. Appl. No. 15/192,827, 10 pp.

Final Office Action dated Jan. 4, 2019, from U.S. Appl. No. 15/289,111, 13 pp.

Notice of Allowance dated Aug. 9, 2018, from U.S. Appl. No. 15/192,827, 7 pp.

Office Action dated Aug. 2, 2018, from U.S. Appl. No. 15/289,111, 9 pp.

Office Action dated May 29, 2019, from U.S. Appl. No. 15/289,111, 14 pp.

\* cited by examiner

FIG. 1

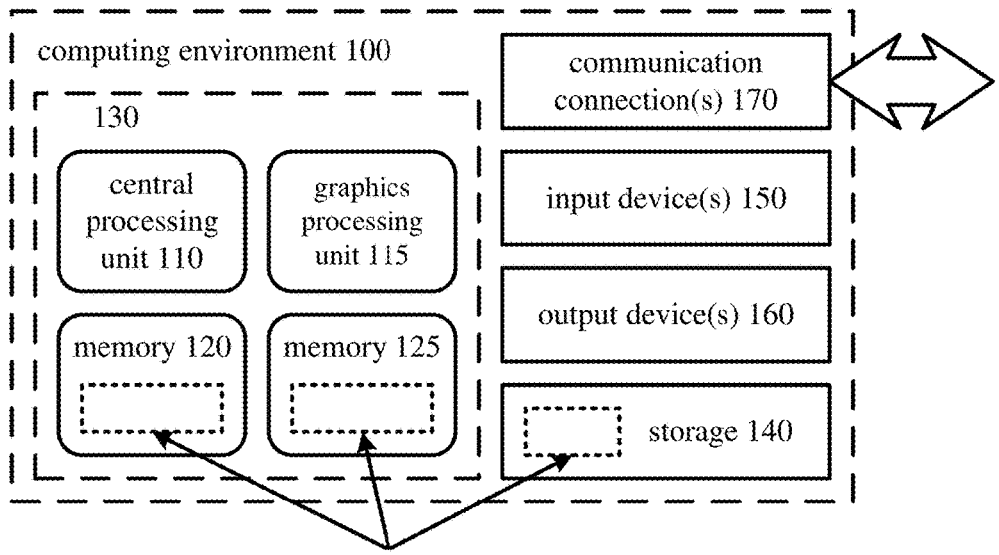

software 180 implementing one or more innovations for efficient decoding and rendering of blocks in a graphics pipeline

FIG. 2

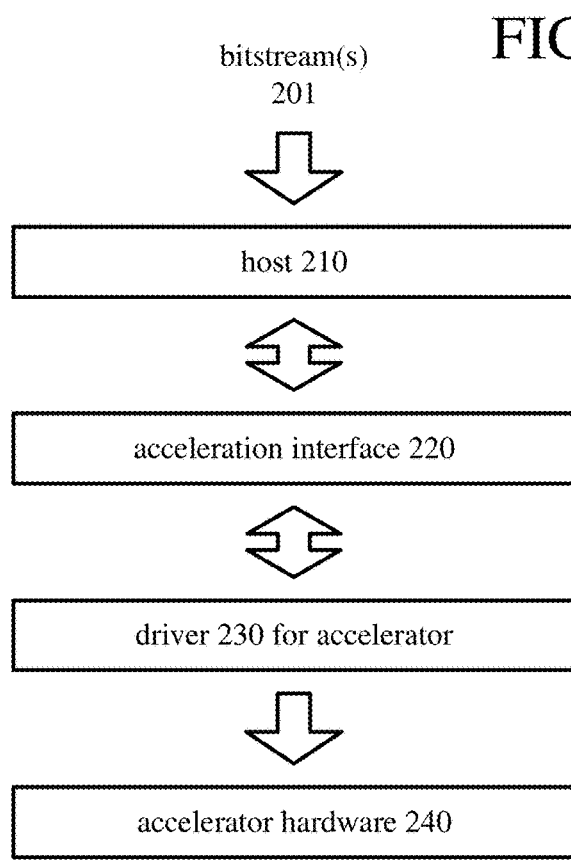

- receives at least part of a bitstream of encoded data for video
- manages at least some decoding and/or rendering operations of accelerator

- transfers data for video and instructions for decoding between host and accelerator

- receives data for video
- performs decoding and/or rendering operations using the data, as managed by host

450

| $Y_{0,0}$ | $Y_{1,0}$ | $Y_{2,0}$ | $Y_{3,0}$ | $Y_{4,0}$ | $Y_{5,0}$ | $Y_{6,0}$ | . . . |
|---|---|---|---|---|---|---|---|
| $Y_{0,1}$ | $Y_{1,1}$ | $Y_{2,1}$ | $Y_{3,1}$ | $Y_{4,1}$ | $Y_{5,1}$ | $Y_{6,1}$ | . . . |
| $Y_{0,2}$ | $Y_{1,2}$ | $Y_{2,2}$ | $Y_{3,2}$ | $Y_{4,2}$ | $Y_{5,2}$ | $Y_{6,2}$ | . . . |
| $Y_{0,3}$ | $Y_{1,3}$ | $Y_{2,3}$ | $Y_{3,3}$ | $Y_{4,3}$ | $Y_{5,3}$ | $Y_{6,3}$ | . . . | sample values (610) for luma (Y) component

| $U_{0,0}$ | $U_{1,0}$ | $U_{2,0}$ | . . . |
|---|---|---|---|
| $U_{0,1}$ | $U_{1,1}$ | $U_{2,1}$ | . . . | sample values (620) for first chroma (U) component

| $V_{0,0}$ | $V_{1,0}$ | $V_{2,0}$ | . . . |
|---|---|---|---|
| $V_{0,1}$ | $V_{1,1}$ | $V_{2,1}$ | . . . | sample values (630) for second chroma (V) component

| $Y_{0,0}$ | $U_{0,0}$ | $V_{0,0}$ | $Y_{1,0}$ | $U_{1,0}$ | $V_{1,0}$ | $Y_{2,0}$ | $U_{2,0}$ | $V_{2,0}$ | . . . |
|---|---|---|---|---|---|---|---|---|---|
| $Y_{0,1}$ | $U_{0,1}$ | $V_{0,1}$ | $Y_{1,1}$ | $U_{1,1}$ | $V_{1,1}$ | $Y_{2,1}$ | $U_{2,1}$ | $V_{2,1}$ | . . . |
| $Y_{0,2}$ | $U_{0,2}$ | $V_{0,2}$ | $Y_{1,2}$ | $U_{1,2}$ | $V_{1,2}$ | $Y_{2,2}$ | $U_{2,2}$ | $V_{2,2}$ | . . . |
| $Y_{0,3}$ | $U_{0,3}$ | $V_{0,3}$ | $Y_{1,3}$ | $U_{1,3}$ | $V_{1,3}$ | $Y_{2,3}$ | $U_{2,3}$ | $V_{2,3}$ | . . . |
| $Y_{0,4}$ | $U_{0,4}$ | $V_{0,4}$ | $Y_{1,4}$ | $U_{1,4}$ | $V_{1,4}$ | $Y_{2,4}$ | $U_{2,4}$ | $V_{2,4}$ | . . . | sample values (710) for luma (Y) and chroma (U, V) components

| inter | inter | inter | inter | inter | inter |
|-------|-------|-------|-------|-------|-------|
| inter | intra ⇨ | intra | intra | inter | inter |
| inter | intra ⇨ | intra | inter | inter | ⇨ intra |
| inter | inter | inter | inter | intra | inter | intra-coded blocks that may have dependencies on adjacent inter-coded blocks

FIG. 8b  810

| inter | inter | inter | inter | inter | inter |
|-------|-------|-------|-------|-------|-------|
| inter | intra ⇨ | intra | intra | inter | inter |
| inter | intra ⇨ | intra | inter | inter | intra |
| inter | inter | inter | inter | intra | inter | intra-coded blocks that may not have dependencies on adjacent inter-coded blocks

FIG. 12    1200
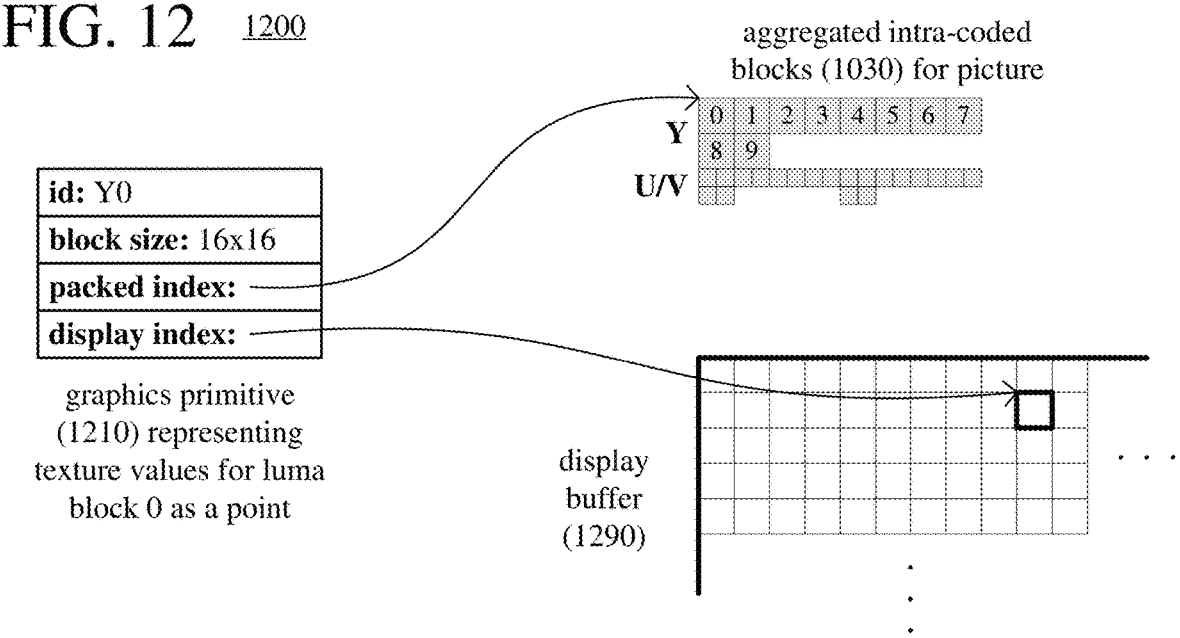
graphics primitive (1210) representing texture values for luma block 0 as a point
FIG. 14    1400
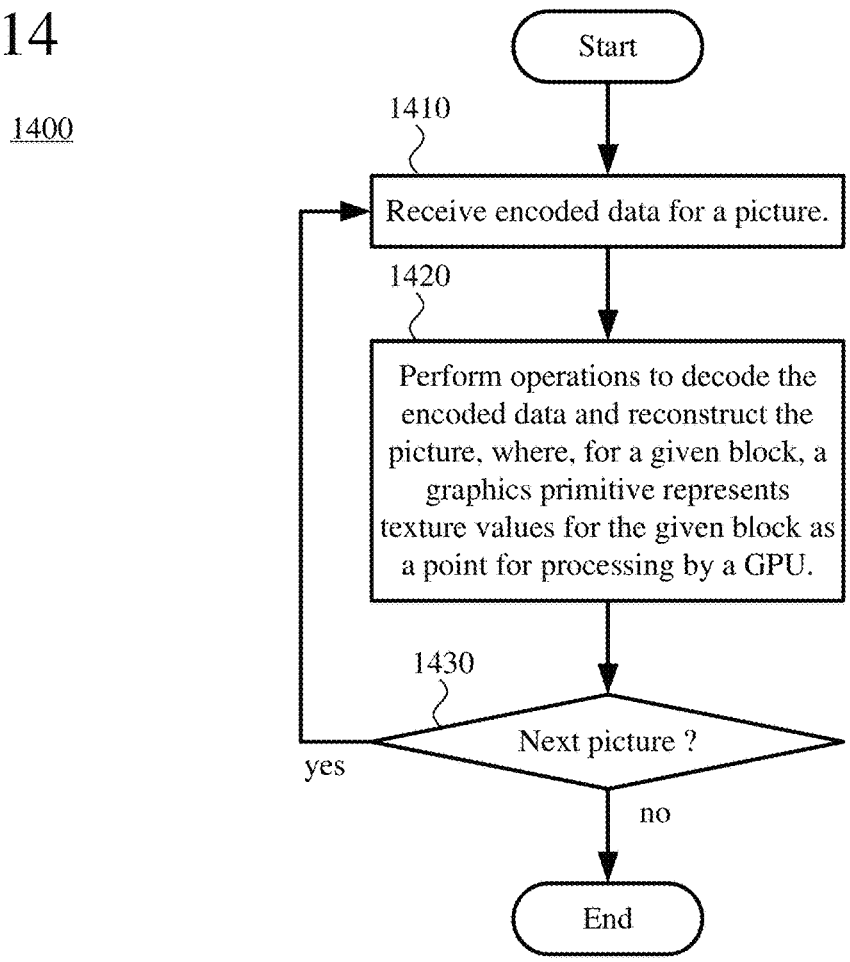

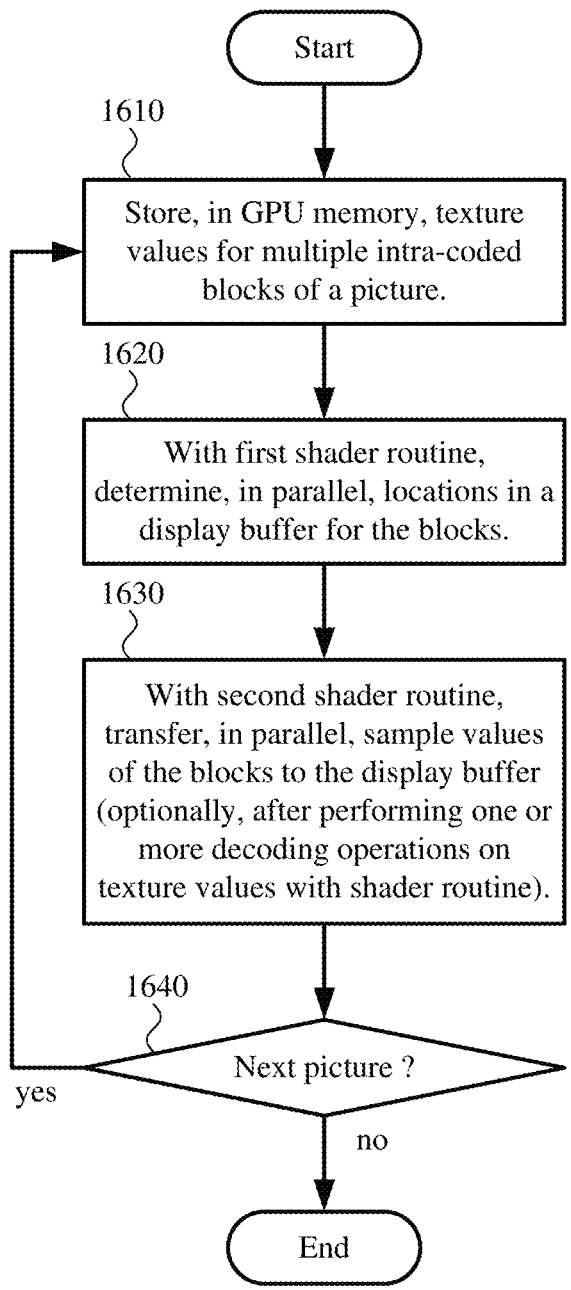

EFFICIENT DECODING AND RENDERING OF BLOCKS IN A GRAPHICS PIPELINE

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (ISO/IEC 23008-2) standards, the MPEG-1 (ISO/IEC 11172-2) and MPEG-4 Visual (ISO/IEC 14496-2) standards, and the SMPTE 421M (VC-1) standard. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

Conventionally, a video playback tool includes a video decoder as well as functionality to render reconstructed video pictures for display. Video decoding and rendering operations can be computationally intensive. In particular, while some video decoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video) or decoding of low-latency video (e.g., for remote desktop conferencing or real-time communication).

Thus, some video playback tools use hardware acceleration to offload certain computationally intensive operations to a graphics processor or other special-purpose hardware. For example, in some configurations, a computer system includes a primary central processing unit ("CPU") (or multiple primary CPUs) as well as a graphics processing unit ("GPU") or other hardware specially adapted for graphics processing or video decoding. A video playback tool uses the primary CPU as a host to control overall decoding and uses the GPU (or special-purpose decoding hardware) to perform operations that collectively require extensive computation, accomplishing video acceleration. In a typical software architecture for hardware-accelerated video decoding, a host controls overall decoding and may perform some operations such as bitstream parsing using the CPU(s). The decoder signals data to a device driver for an accelerator (e.g., with a GPU) across an acceleration interface.

A video playback tool often requests encoded video from a server over a network. For this reason, a video playback tool may be referred to as a "client." A video playback tool can be adapted to the computing platform on which the video playback tool runs ("native client"). For example, a native client can be specially adapted to run on a particular operating system ("OS") and/or hardware configuration, using libraries of the OS or using operations specific to a CPU. When the hardware configuration includes a GPU, the native client can use the GPU to perform certain decoding and rendering operations, which can further speed up the decoding and rendering process. On the other hand, the process of developing native clients for different OSs, platforms, etc. can be time-consuming, especially as the number of versions of OSs and hardware configurations increases, and the installation process for native clients can be complicated.

According to an alternative approach, a video playback tool manages video playback in conjunction with a Web browser. The browser-based video playback tool can include routines in a scripting language or other browser-executable programming language, which can be run in a Web browser environment on diverse computing platforms and OSs. The routines are specified in a platform-agnostic way, which simplifies the development process and installation process. On the other hand, previous browser-based video playback tools can be overwhelmed by the computational complexity of video decoding and rendering operations, especially for time-sensitive scenarios such as remote desktop presentation and real-time communication.

SUMMARY

In summary, the detailed description presents innovations in video decoding and rendering operations in a graphics pipeline, in which at least some of the operations are performed using a graphics processing unit ("GPU"). The innovations can speed up the process of decoding and rendering video content, which is especially useful for scenarios such as remote desktop presentation or real-time conferencing.

According to one aspect of the innovations described herein, a video playback tool stores encoded data for a picture. The video playback tool performs operations to decode the encoded data and reconstruct the picture. For a given block (e.g., of a macroblock, coding unit) of the picture, a graphics primitive represents texture values for the given block as a point for processing by a GPU. The graphics primitive for the given block can have one or more attributes, such as a block size for the given block, a display index value (indicating the location of the given block in a display buffer), the texture values for the given block, or a packed index value (indicating the location of the texture values for the given block in a texture buffer in GPU memory, which is memory accessible by a GPU). The given block can be an intra-coded block or inter-coded block, and the texture values for the given block can be sample values or transform coefficients.

According to another aspect of the innovations described herein, a video playback tool decodes texture values for multiple intra-coded blocks of a picture. The video playback tool aggregates the texture values for the intra-coded blocks in central processing unit ("CPU") memory, which is memory accessible by a CPU. Typically, the texture values in CPU memory are in a planar color component format, e.g., a planar YUV format. Then, the video playback tool transfers the texture values for the intra-coded blocks from the CPU memory to GPU memory. The texture values for the intra-coded blocks are still aggregated in the GPU memory. For a given block of the multiple intra-coded blocks, the texture values can be sample values or transform coefficients.

According to another aspect of the innovations described herein, a video playback tools stores, in GPU memory, texture values for multiple intra-coded blocks of a picture. The video playback tool uses one or more shader routines executable by the GPU. With a first shader routine, the video playback tool determines, in parallel, locations in a display buffer for the multiple blocks, respectively. Then, with a second shader routine, the video playback tool transfers, in parallel, sample values of the multiple blocks, respectively, to the display buffer. Typically, the sample values in the display buffer are in a packed color component format, e.g., a packed YUV format or packed RGB format. The transferring to the display buffer can be performed in multiple passes (e.g., a first pass for luma sample values, and a second pass for chroma sample values). A bit mask can be used to control which of the sample values are written in the multiple passes, respectively.

According to another aspect of the innovations described herein, when the texture values for a given block are transform coefficients, with one or more shader routines, the video playback tool can perform decoding operations such as (1) inverse frequency transform operations on the transform coefficients to reconstruct residual values, (2) intra-picture prediction operations to determine predicted values, (3) combination operations to combine the residual values with the predicted values, thereby reconstructing sample values of the given block, (4) filtering operations to selectively filter boundaries of the given block, and/or (5) chroma upsampling operations and/or color space conversion operations using the sample values. Or, when the texture values for the given block are sample values, with one or more shader routines, the video playback tool can perform decoding operations such as (1) filtering operations to selectively filter boundaries of the given block, and/or (2) chroma upsampling operations and/or color space conversion operations using the sample values of the given block.

In some example implementations, a video playback tool incorporating one or more of the innovations described herein is implemented using one or more decoding routines executable in a browser environment running on a CPU as well as one or more shader routines executable with a GPU. Alternatively, a video playback tool incorporating one or more of the innovations described herein uses one or more native code routines executable with a CPU as well as one or more shader routines executable with a GPU.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram illustrating an example computing system in which some described embodiments can be implemented.

FIG. 2 is a diagram of an example architecture for hardware-accelerated decoding of video bitstreams.

FIG. 6 is a diagram illustrating sample values in a planar YUV format, and FIG. 7 is a diagram illustrating sample values in a packed YUV format.

FIGS. 8a and 8b are diagram illustrating features of inter-picture prediction, intra-picture prediction, and constrained intra-picture prediction.

FIG. 12 is a diagram illustrating an example of a graphics primitive that represents, as a point, texture values for a given block for processing by a GPU.

FIG. 14 is a flowchart illustrating a generalized technique for video decoding and rendering in which a graphics primitive represents texture values for a given block as a point for processing by a GPU.

FIG. 16 is a flowchart illustrating a generalized technique for video decoding and rendering in which shader routines transfer sample values from GPU memory to a display buffer.

DETAILED DESCRIPTION

Figure 3A:
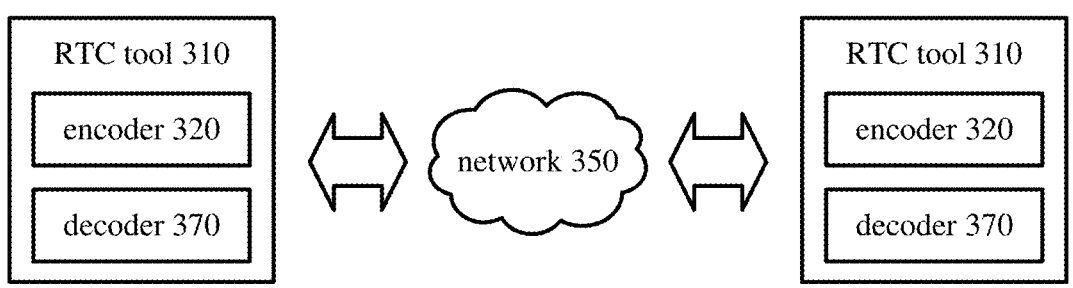
FIGS. 3a and 3b are diagrams illustrating example network environments in which some described embodiments can be implemented.

The detailed description presents innovations in video decoding and rendering operations in a graphics pipeline, in which at least some of the operations are performed using a graphics processing unit ("GPU"). The innovations can speed up the process of decoding and rendering video content, which is especially useful for scenarios such as remote desktop presentation or real-time conferencing.

Some of the innovations described herein are illustrated with reference to terms specific to the H.264 standard or H.265 standard, or extensions or variations thereof. The innovations described herein can also be implemented for other video codec standards or formats (e.g., the VP8 format or VP9 format), or extensions or variations thereof.

According to some of the innovations described herein, certain operations of decoding and/or rendering are offloaded to a GPU. The GPU supports one or more interfaces through which shader routines can be specified. For example, the interfaces are WebGL or OpenGL interfaces. WebGL is a JavaScript application programming interface ("API") for rendering graphics within a compatible Web browser, without the use of plug-ins. Using WebGL, a browser can incorporate GPU-accelerated processing and effects as part of rendering a Web page. OpenGL is a cross-language, cross-platform API for rendering graphics, which may be used to interact with a GPU and thereby achieve hardware-accelerated rendering. Alternatively, the GPU exposes another interface.

In many examples described herein, a video playback tool performs at least some decoding and/or rendering operations in a browser environment running on a CPU, and offloads other decoding and/or rendering operations to a GPU. In some example implementations, the decoding and/or rendering operations performed in the browser environment can be performed without using any plugins or client-side decoding software outside the browser. For example, the decoding and/or rendering operations performed in the browser environment are part of a "clientless" gateway, which does not require any plugins or client-side decoding software outside the browser in order to support remote desktop presentation or virtual network computing functionality. Software routines for the decoding and/or rendering operations performed in the browser environment and software routines for the decoding and/or rendering operations offloaded to the GPU can be downloaded to the browser environment from a server, then executed locally. Alternatively, the video playback tool performs at least some decoding and/or rendering operations with native code running on a CPU, and offloads other decoding and/or rendering operations to a GPU. For example, a client executing native code transfers texture values for blocks of a picture to a GPU, which performs decoding operations and/or transfers sample values to a display buffer using shader routines as described herein.

Using innovations described herein, a video playback tool can reconstruct screen capture content with very low decoding latency. Performance improvements are especially noticeable for non-camera video content with sparse intra-coded blocks (i.e., video content for which a typical picture is encoded mostly with skipped blocks or other inter-coded blocks but also with a few intra-coded blocks scattered around the picture, usually for changed regions). Such video is common for remote desktop presentation scenarios. More generally, the innovations described herein can be used when decoding other types of video (e.g., "natural" video captured with a camera), especially when latency reduction is a goal (e.g., real-time communication scenarios).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. Typically, the GPU (115) has a highly parallel structure adapted for processing blocks of visual data in parallel, which tends to make the GPU (115) more effective than the general-purpose CPU (110) for 3D computer graphics, 2D computer graphics, and other image processing. The GPU (115) can be implemented as part of a dedicated graphics card (video card), as part of a motherboard, as part of a system on a chip ("SoC"), or in some other way (even on the same die as the CPU (110)). In some example implementations, in addition to supporting operations for texture mapping, rendering of polygons, and geometric calculations (such as rotation and translation of vertices between coordinate systems), the GPU (115) includes support for programmable shader routines. In general, a shader routine is any set of instructions executable by the GPU (115), which may be executed to manipulate vertices and textures with a wide range of operations. Many of the computations of the GPU (115) involve matrix and vector operations. In some example implementations, the GPU (115) provides specialized support for video decoding and playback operations such as entropy decoding/bitstream parsing, inverse quantization, inverse frequency transforms, motion compensation, intra-picture prediction, deblock filtering, processing in a YUV format, blending and overlays, in addition to providing buffers for reconstructed video pictures.

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for efficient decoding and rendering of blocks in a graphics pipeline, which includes one or more GPUs, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for efficient decoding and rendering of blocks in a graphics pipeline.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "receive" to describe computer operations in a computer system. These terms are high-level abstractions for operations performed by a computer, and should not be confused with acts performed by a human being. The actual computer operations corresponding to these terms vary depending on implementation.

II. Architecture for Hardware-Accelerated Decoding.

FIG. 2 shows a simplified architecture (200) for hardware-accelerated decoding using a video playback tool. The architecture includes a host (210), an accelerator interface (220), a driver (230) for an accelerator, and accelerator hardware (240) for the accelerator. The driver (230) and accelerator hardware (240) collectively provide functionality for the accelerator. The accelerator hardware (240) can be, for example, one or more GPUs or special-purpose decoding hardware. In many of the examples described herein, the accelerator hardware (240) includes one or more GPUs.

The host (210) receives at least part of a bitstream (201) of encoded data for video and manages at least some video decoding operations and/or rendering operations of the accelerator. For example, the host (210) controls overall decoding and can also perform some decoding operations using a host CPU, e.g., entropy decoding operations. The host (210) signals control data and other data for a picture to the driver (230) for the accelerator hardware (240) across an acceleration interface (220). Typically, the host (210) is implemented as user-mode software. For example, the host (210) operates in a browser environment running on a CPU. Or, the host (210) executes native code running on a CPU.

To the host (210), the acceleration interface (220) provides a consistent interface to an accelerator, regardless of the provider of the accelerator. Conversely, to an accelerator, the acceleration interface (220) provides a consistent interface to a host, regardless of the provider of the host. In general, the acceleration interface (220) transfers data for video and instructions for decoding between the host (210) and the accelerator. The details of the acceleration interface (220) depend on implementation. For example, the acceleration interface (220) is exposed to the host (210) as an application programming interface ("API"). The acceleration interface (220) can be a WebGL API (operating in conjunction with a Web browser such as Microsoft Internet Explorer, Microsoft Edge, Google Chrome, Mozilla Firefox, Apple Safari, etc.), OpenGL API, or other API.

In an example interaction, the host (210) fills a buffer with instructions and/or data then calls a method of the interface (220) to alert the driver (230). The buffer is part of CPU memory (memory that is accessible by a CPU). The buffered instructions and/or data are typically passed to the driver (230) by reference, and as appropriate transferred to memory of the accelerator hardware (240), e.g., to GPU memory (memory that is accessible by a GPU). While a particular implementation of the accelerator interface (220) and driver (230) may be tailored to a particular OS or platform, in general, the accelerator interface (220) and/or driver (230) can be implemented for multiple different OSs or platforms. The host (210) follows specified conventions when putting instructions and data in buffers in CPU memory. The driver (230) retrieves the buffered instructions and data according to the specified conventions and (with the accelerator hardware (240)) performs decoding and/or rendering operations.

The accelerator, through the driver (230) and accelerator hardware (240), receives data for video and performs video decoding operations and/or rendering operations using the data, as managed by the host (210). The division of decoding operations between the host (210) and the accelerator depends on implementation. For example, the host (210) performs basic bitstream parsing tasks, selectively enables/disables certain decoding operations (such as deblock filtering), manages buffering and updates of reference frames, and manages output of frames for display, and the remaining decoding functions such as inverse frequency transforms, inverse quantization/scaling, motion compensation, intra-picture prediction, loop filtering and post-processing are offloaded to the accelerator. Alternatively, the host (210) performs certain additional decoding tasks instead of the accelerator, or the accelerator performs certain additional tasks otherwise performed by the host (210).

III. Example Network Environments.

Figure 3B:
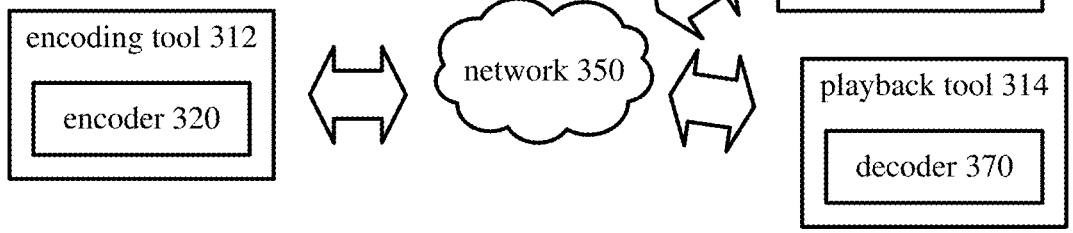

FIGS. 3a and 3b show example network environments (301, 302) that include video encoders (320) and video decoders (370). The encoders (320) and decoders (370) are connected over a network (350) using an appropriate communication protocol. The network (350) can include the Internet or another computer network.

In the network environment (301) shown in FIG. 3a, each real-time communication ("RTC") tool (310) includes both an encoder (320) and a decoder (370) for bidirectional communication. Although FIG. 3a shows a single RTC tool per node, the encoder (320) is part of a video capture tool, and the decoder (370) is part of a video playback tool. A given encoder (320) can produce output compliant with the H.265/HEVC standard, SMPTE 421M standard, ISO/IEC 14496-10 standard (also known as H.264/AVC), another standard, or a proprietary format such as VP8 or VP9, or a variation or extension thereof, with a corresponding decoder (370) accepting encoded data from the encoder (320). The bidirectional communication can be part of a video conference, video telephone call, or other two-party or multi-party communication scenario. Although the network environment (301) in FIG. 2a includes two RTC tools (310), the network environment (301) can instead include three or more RTC tools (310) that participate in multi-party communication.

Figure 4:
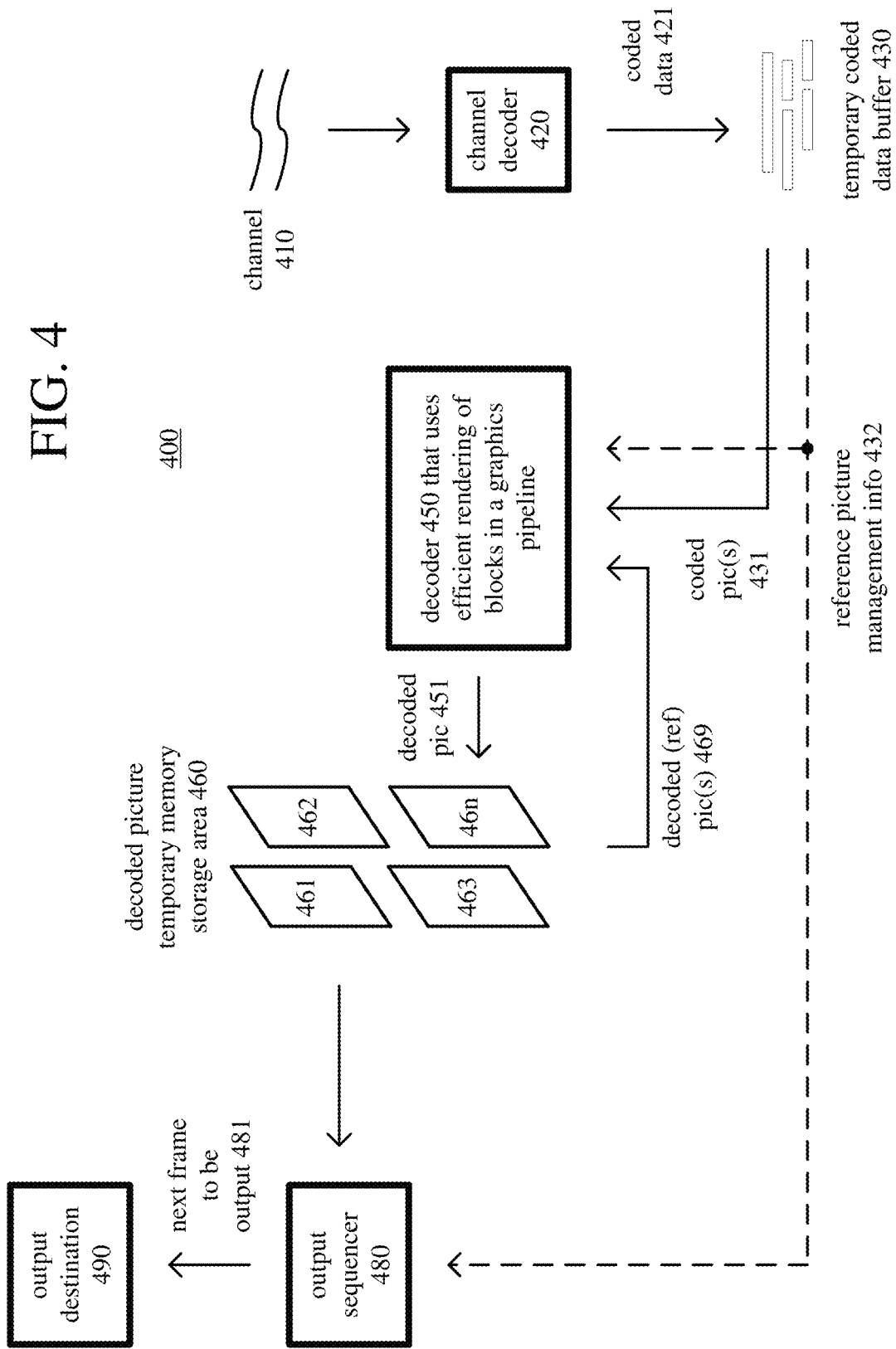
FIG. 4 is a diagram of an example decoder system in conjunction with which some described embodiments can be implemented.

An RTC tool (310) manages encoding by an encoder (320) and also manages decoding by a decoder (370). FIG. 4 shows an example decoder system (400) that can be included in the RTC tool (310). Alternatively, the RTC tool (310) uses another decoder system.

In the network environment (302) shown in FIG. 3b, an encoding tool (312) includes an encoder (320) that encodes video for delivery to multiple playback tools (314), which include decoders (370). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (302) in FIG. 3b includes two playback tools (314), the network environment (302) can include more or fewer playback tools (314). In general, a playback tool (314) communicates with the encoding tool (312) to determine a stream of video for the playback tool (314) to receive. The playback tool (314) receives the stream, buffers the received encoded data for an appropriate period, and begins decoding and playback.

The encoding tool (312) can include server-side controller logic for managing connections with one or more playback tools (314). A playback tool (314) can include client-side controller logic for managing connections with the encoding tool (312). FIG. 4 shows an example decoder system (400) that can be included in the playback tool (314). Alternatively, the playback tool (314) uses another decoder system.

IV. Example Decoder Systems.

FIG. 4 is a block diagram of an example video decoder system (400) in conjunction with which some described embodiments may be implemented. The video decoder system (400) includes a video decoder (450), which is further detailed in FIG. 5. As part of the decoding, the video decoder system (400) can use acceleration hardware (e.g., one or more GPUs) to perform various decoding operations and/or rendering operations.

The video decoder system (400) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (400) can be adapted for decoding of a particular type of content (e.g., screen capture video) or adapted for decoding of various types of content. The video decoder system (400) can be implemented as part of an OS module, as part of an application library, as part of a standalone application, as software executing in a browser environment, or using special-purpose hardware. Overall, the video decoder system (400) receives coded data from a channel (410) and produces reconstructed pictures as output for an output destination (490).

The reconstructed pictures can be produced at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for YUV 4:2:0 format) in order to reduce the spatial resolution of chroma sample values, or the chroma sample values may have the same resolution as the luma sample values (e.g., for YUV 4:4:4 format).

During different stages of decoding and rendering, sample values of a picture may be represented in memory in a planar format or in a packed format. FIG. 6 shows an example (600) of sample values in a planar YUV format, in which sample values are stored in memory using separate arrays for different color components. A first array stores sample values (610) of the luma (Y) component, logically organized by location within the picture. A second array stores sample values (620) of the first chroma (U) component, logically organized by location within the picture. A third array stores sample values (620) of the second chroma (V) component, logically organized by location within the picture. In the example (600) of FIG. 6, the chroma sample values (620, 630) have been downsampled by a factor of two horizontally and vertically. (In practice, the sample values of a given color component can be represented in a one-dimensional array (row-after-row or column-after-column), not a two-dimensional array as shown in FIG. 6.) Thus, for the example (600) of planar YUV format shown in FIG. 6, sample values for a given pixel are represented in three different arrays in memory. Although FIG. 6 shows sample values stored in a planar YUV format, alternatively, some other type of texture values (e.g., transform coefficients) is stored in the planar YUV format, as described in the next section.

FIG. 7 shows an example (700) of sample values in a packed YUV format, in which sample values for a given pixel are collocated in memory. An array stores sample values (710) of the luma (Y) component interleaved with sample values of the chroma (U, V) components. In the example (700) of FIG. 7, chroma sample values have the same spatial resolution as luma sample values. Alternatively, a packed format can include sample values in another color space (such as RGB or GBR) after color space conversions, and can potentially include one or more additional values per pixel (e.g., an opacity value per pixel).

With reference to FIG. 4, the decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been organized for transmission or storage as a media stream (e.g., according to a media program stream or transport stream format such as ITU-T H.222.0| ISO/IEC 13818-1 or an Internet real-time transport protocol format such as IETF RFC 3550), in which case the channel decoder (420) can parse syntax elements added as part of the syntax of the media transmission stream. Or, the channel decoder (420) separates coded video data that has been organized for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data buffer (430) until a sufficient quantity of such data has been received. The coded data (421) includes coded pictures (431) and reference picture management information (432). The coded data (421) in the coded data buffer (430) contain, as part of the syntax of an elementary coded video bitstream, coded data for one or more pictures. The coded data (421) in the coded data buffer (430) can also include media metadata relating to the encoded video data (e.g., as one or more parameters in one or more supplemental enhancement information ("SEI") messages or video usability information ("VUI") messages).

In general, the coded data buffer (430) temporarily stores coded data (421) until such coded data (421) is used by the video decoder (450). At that point, coded data for a coded picture (431) and reference picture management information (432) are transferred from the coded data buffer (430) to the video decoder (450). As decoding continues, new coded data is added to the coded data buffer (430) and the oldest coded data remaining in the coded data buffer (430) is transferred to the video decoder (450).

Figure 5:
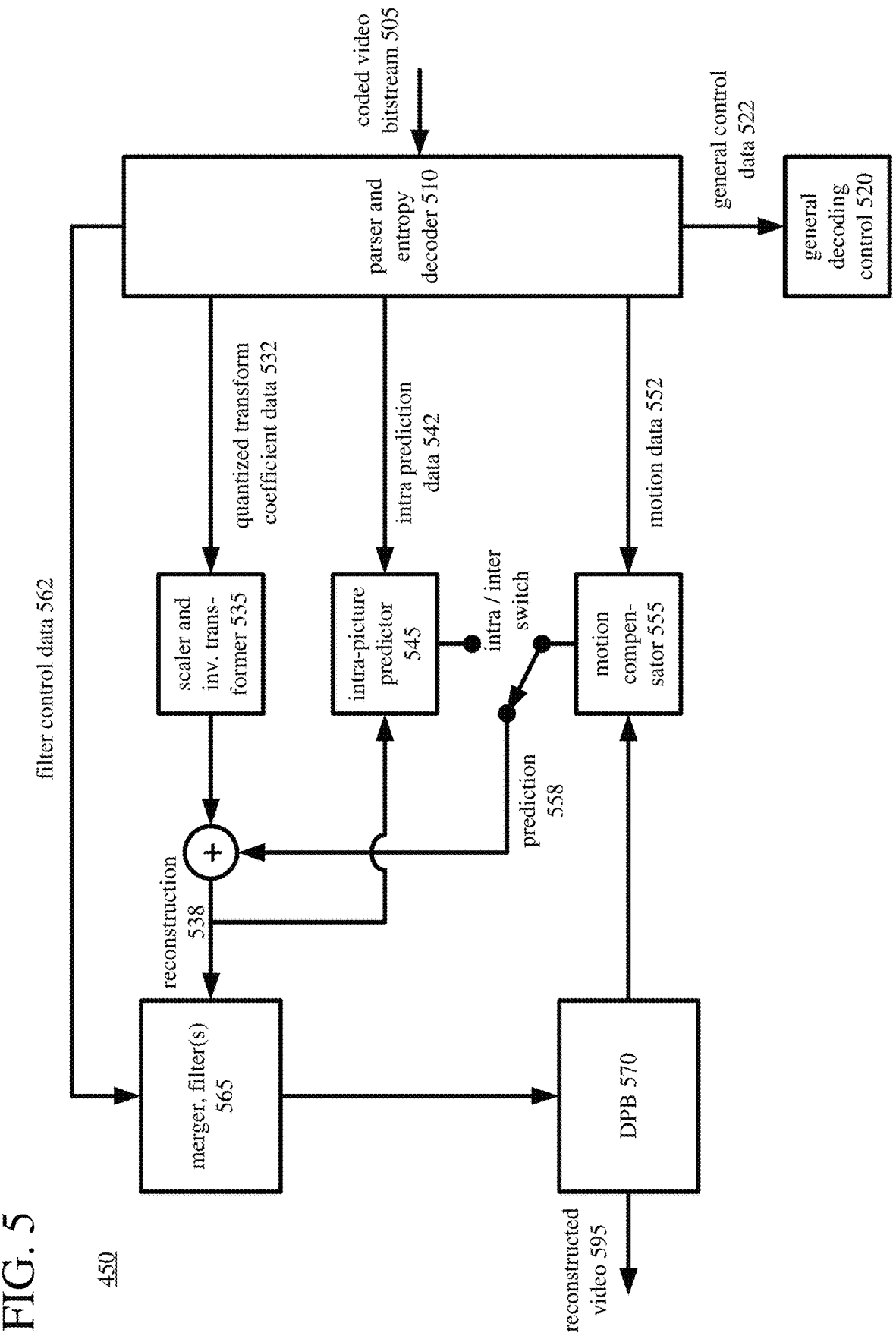
FIG. 5 is a diagram illustrating an example video decoder in conjunction with which some described embodiments can be implemented.

The video decoder (450) decodes a coded picture (531) to produce a corresponding decoded picture (451). As shown in FIG. 5, the video decoder (450) receives the coded picture (431) as input as part of a coded video bitstream (405). The video decoder (450) produces the corresponding decoded picture (451) as output as reconstructed video (595).

The syntax of the coded video bitstream (elementary bitstream) is typically defined in a codec standard or format, or extension or variation thereof. The encoded data in the elementary bitstream includes syntax elements organized as syntax structures. In general, a syntax element can be any element of data, and a syntax structure is zero or more syntax elements in the elementary bitstream in a specified order.

Generally, the video decoder (450) includes multiple decoding modules that perform decoding tasks such as entropy decoding, inverse quantization, inverse frequency transforms, motion compensation, intra-picture prediction, and filtering. Many of the components of the decoder (450) are used for both intra-picture decoding (that is, decoding of intra-coded blocks) and inter-picture decoding (that is, decoding of inter-coded blocks). The exact operations performed by those components can vary depending on the type of information being decompressed. The format of the coded video bitstream (405) can be a Windows Media Video format, VC-1 format, MPEG-x format (e.g., MPEG-1, MPEG-2, or MPEG-4), H.26x format (e.g., H.261, H.262, H.263, H.264, H.265), or VPx format, or a variation or extension thereof, or some other format.

A picture can be organized into multiple tiles of the same size or different sizes. For example, a picture is split along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values.

For syntax according to the H.264/AVC standard, a picture can be partitioned into one or more slices of the same size or different sizes. A picture (or slice) is split into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra.

A MB includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A MB also has one or more residual data units for purposes of residual coding/decoding.

For syntax according to the H.265/HEVC standard, a picture (or slice or tile) is split into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. A CU also typically has one or more transform units for purposes of residual coding/decoding, where a transform unit ("TU") has a luma transform block ("TB") and two chroma TB s. A CU may contain a single TU (equal in size to the CU) or multiple TUs. According to quadtree syntax, a TU can be split into four smaller TUs, which may in turn be split into smaller TUs according to quadtree syntax. A video encoder decides how to partition video into CTUs (CTBs), CUs (CBs), PUs (PBs) and TUs (TBs).

As used herein, the term "block" can indicate a MB, residual data unit, CTB, CB, PB or TB, or some other set of sample values, depending on context. The term "unit" can indicate a MB, CTU, CU, PU, TU or some other set of blocks, or it can indicate a single block, depending on context.

With reference to FIG. 5, a buffer receives encoded data in the coded video bitstream (505) and makes the received encoded data available to the parser/entropy decoder (510). The parser/entropy decoder (510) entropy decodes entropy-coded data, typically applying the inverse of entropy coding performed in the encoder (540) (e.g., context-adaptive binary arithmetic decoding with binarization using Exponential-Golomb or Golomb-Rice). Thus, the parser/entropy decoder (510) decompresses quantized transform coefficient values as well as certain side information (e.g., MV information, QP values, mode decisions, parameter choices, filter parameters). Typical entropy decoding techniques include Exponential-Golomb decoding, Golomb-Rice decoding, context-adaptive binary arithmetic decoding, differential decoding, Huffman decoding, run length decoding, variable-length-to-variable-length decoding, variable-length-to-fixed-length decoding, Lempel-Ziv decoding, dictionary decoding, and combinations of the above. The entropy decoder can use different decoding techniques for different kinds of information, can apply multiple techniques in combination, and can choose from among multiple code tables within a particular decoding technique. In FIG. 5, as a result of parsing and entropy decoding, the parser/entropy decoder (510) produces general control data (522), quantized transform coefficient data (532), intra prediction data (542), motion data (552), and filter control data (562).

The general decoding control (520) receives the general control data (522). For example, the general control data (522) includes information indicating which reference pictures to retain in the decoded picture buffer ("DPB") (570). The general decoding control (520) provides control signals (not shown) to other modules (such as the scaler/inverse transformer (535), intra-picture predictor (545), motion compensator (555), and intra/inter switch) to set and change decoding parameters during decoding.

With reference to FIG. 4, as appropriate, when performing its decoding process, the video decoder (450) may use one or more previously decoded pictures (469) as reference pictures for inter-picture prediction. The video decoder (450) reads such previously decoded pictures (469) from a decoded picture temporary memory storage area (460), which is, for example, the DPB (570).

With reference to FIG. 5, if the current picture is predicted using inter-picture prediction, a motion compensator (555) receives the motion data (552), such as MV data, reference picture selection data and merge mode index values. A given picture can be entirely or partially coded using inter-picture prediction. An "inter-coded block" is a block coded using inter-picture prediction. The motion compensator (555) applies MVs to the reconstructed reference picture(s) from the DPB (570). The motion compensator (555) produces predicted values (that is, motion-compensated prediction values) for inter-coded blocks of the current picture.

In a separate path within the video decoder (450), the intra-picture predictor (545) receives the intra prediction data (542), such as information indicating the prediction mode/direction used. A given picture can be entirely or partially coded using intra-picture prediction. An "intra-coded block" is a block coded using intra-picture prediction. For intra spatial prediction, using values of a reconstruction (538) of the current picture, according to the prediction mode/direction, the intra-picture predictor (545) spatially predicts sample values of a current block of the current picture from neighboring, previously reconstructed sample values of the current picture. Or, for intra block copy mode, the intra-picture predictor (545) predicts the sample values of a current block using previously reconstructed sample values of a reference block, which is indicated by an offset (block vector) for the current block.

The intra/inter switch selects values of a motion-compensated prediction or intra-picture prediction for use as the prediction (558) for a given block. For example, when H.265/HEVC syntax is followed, the intra/inter switch can be controlled based on a syntax element encoded for a CU of a picture that can contain intra-coded CUs and/or inter-coded CUs. When residual values have been encoded/signaled, the video decoder (450) combines the prediction (558) with reconstructed residual values to produce the reconstruction (538) of the content from the video signal. When residual values have not been encoded/signaled, the video decoder (550) uses the values of the prediction (558) as the reconstruction (538).

The video decoder (450) also reconstructs prediction residual values. To reconstruct the residual when residual values have been encoded/signaled, the scaler/inverse transformer (535) receives and processes the quantized transform coefficient data (532). In the scaler/inverse transformer (535), a scaler/inverse quantizer performs inverse scaling and inverse quantization on the quantized transform coefficients. The scaler/inverse transformer (535) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof), and can have a variable block size. If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (450) combines reconstructed prediction residual values with prediction values of the prediction (558), producing values of the reconstruction (538).

For intra-picture prediction, the values of the reconstruction (538) can be fed back to the intra-picture predictor (545). For inter-picture prediction, the values of the reconstruction (538) can be further filtered. In the merger/filter(s) (565), the video decoder (450) merges content from different tiles into a reconstructed version of the picture. The video decoder (450) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the video decoder (450) or a syntax element within the encoded bitstream data. The DPB (570) buffers the reconstructed current picture for use as a reference picture in subsequent motion-compensated prediction.

The video decoder (450) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

Post-processing can also include color space conversion and/or upsampling of chroma sample values. As part of post-processing, when chroma sample values have been downsampled for encoding, the chroma sample values can be replicated or filtered to upsample the chroma sample values to the original chroma sample resolution, such that chroma resolution matches luma resolution. As part of post-processing, sample values can be converted from a YUV format to another format such as RGB or GBR. The sample values in the destination color format (e.g., RGB, GBR) can also include opacity values (sometimes called alpha values and designated with the letter a, as in RGBa).

With reference to FIG. 4, the decoded picture temporary memory storage area (460) includes multiple picture buffer storage areas (461, 462, . . . , 46n). The decoded picture storage area (460) is, for example, the DPB (570). The decoder (450) uses the reference picture management information (432) to identify a picture buffer (461, 462, etc.) in which it can store a decoded picture (451). The decoder (450) stores the decoded picture (451) in that picture buffer. In a manner consistent with the reference picture management information (432), the decoder (450) also determines whether to remove any reference pictures from the multiple picture buffer storage areas (461, 462, . . . , 46n).

An output sequencer (480) identifies when the next picture to be produced in display order (also called output order) is available in the decoded picture storage area (460). When the next picture (481) to be produced in display order is available in the decoded picture storage area (460), it is read by the output sequencer (480) and output to the output destination (490) (e.g., display). In general, the order in which pictures are output from the decoded picture storage area (460) by the output sequencer (480) (display order) may differ from the order in which the pictures are decoded by the decoder (450) (bitstream order).

Depending on implementation and the type of decompression desired, modules of the video decoder system (400) and/or video decoder (450) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (400). Specific embodiments of video decoders typically use a variation or supplemented version of the video decoder (450). The relationships shown between modules within the video decoder system (400) and video decoder (450) indicate general flows of information in the video decoder system (400) and video decoder (450), respectively; other relationships are not shown for the sake of simplicity. In general, a given module of the video decoder system (400) or video decoder (450) can be implemented by software executable on a CPU, by software controlling special-purpose hardware (e.g., graphics hardware for video acceleration), or by special-purpose hardware (e.g., in an ASIC).

V. Efficient Decoding and Rendering of Blocks in a Graphics Pipeline.

This section describes innovations in video decoding and rendering operations in a graphics pipeline, in which at least some of the operations are performed using a graphics processing unit ("GPU"). The innovations can speed up the process of decoding and rendering video content, which is especially useful for scenarios such as remote desktop presentation, e.g., using remote desktop protocol ("RDP"), or real-time conferencing.

In some remote desktop presentation scenarios, a browser connects to a server in order to provide a remote desktop presentation connection. Decoding and/or rendering operations can be provided through program code (e.g., JavaScript code) executable in a browser environment for any compatible browser (e.g., HTML5-compatible browser), without requiring any plugins or client-side decoding software outside the browser environment. As such, the browser-based code may be executable on a variety of OSs and platforms (e.g., smartphone, tablet, laptop computer), without any platform-specific or OS-specific modifications. For newer codec standards and formats such as the H.264 standard, H.265 standard, VP8, and VP9, performing video decoding and rendering operations using such browser-based code can be challenging. In particular, the CPU(s) available on a platform might not be powerful enough to support low-latency decoding, especially for high-quality video (e.g., high frame rate, high spatial resolution, low distortion).

In some example implementations, a video playback tool uses a GPU to perform at least some video decoding and rendering operations. The video playback tool can support low-latency performance for remote desktop presentation, real-time conferencing, or other scenarios, even for high-quality video. The video playback tool can use browser-based code that works in any compatible browser (e.g., HTML5-compatible browser) without any client-side plugins or decoding software outside the browser environment. Or, the video playback tool can include native code. In some example implementations, by using specialized graphics primitives and shader routines executable in a GPU to perform block operations in parallel, overall latency is reduced. In particular, this configuration can speed up the process of merging a sparse set of intra-coded blocks from memory in a planar YUV format into actual locations in a display buffer in a packed YUV format.

The innovations described herein include, but are not limited to, the following.

Aggregating texture values for a set of blocks for transfer, as an aggregate, from CPU memory (memory that is accessible by a CPU) to GPU memory (memory that is accessible by a GPU). The blocks can be, for example, blocks of intra-coded MBs or intra-coded CUs. This can reduce the number of separate transfer operations from CPU memory to GPU memory, especially for sparse intra-coded blocks of a picture. The texture values can be stored as an aggregate in GPU memory, which uses less GPU memory for sparse intra-coded blocks, compared to other approaches. For a given block, the texture values that are aggregated can be sample values or transform coefficients. Aggregated texture values can include sample values for one or more blocks and transform coefficients for one or more other blocks.

Using a graphics primitive (e.g., point sprite) to represent texture values for a block as a point in a graphics pipeline. The texture values can be sample values or transform coefficients. The block can be an intra-coded block or inter-coded block. The graphics primitive can have any of various attributes unique to the graphics primitive (and block represented by the graphics primitive). For example, a size attribute of the graphics primitive indicates the dimensions of texture values (e.g., 8×8, 16×16, or some other size) as a single texture coordinate. As another example, a packed index attribute of the graphics primitive indicates the position of texture values for the represented block in GPU memory (e.g., in planar YUV format, in an aggregated collection of texture values). As another example, a display index attribute of the graphics primitive indicates the position of texture values for the represented block in a display buffer (e.g., in a packed format after merger of reconstructed blocks of a picture).

Using shader routines executable in a GPU to transfer texture values from GPU memory to a display buffer and perform other rendering operations and/or decoding operations in a graphics pipeline. After texture values for blocks (e.g., intra-coded blocks) have been gathered in GPU memory, the shader routines can, in parallel, scatter the texture values for different blocks into the display buffer.

Using a vertex shader routine to determine the positions in the display buffer for texture values for blocks (e.g., intra-coded blocks) in parallel. For a given block, the vertex shader routine can set up texture coordinates in the display buffer. The vertex shader routine can use an attribute of a graphics primitive (e.g., the display index attribute of a point sprite) to determine the destination locations in the display buffer for the texture values, which can have dimensions of 8×8, 16×16, etc.

Using a fragment shader routine to scatter texture values for blocks (e.g., intra-coded blocks) in parallel to the appropriate destination locations in the display buffer. The fragment shader routine can transfer luma sample values for blocks in parallel during a first pass, and transfer chroma sample values for blocks in parallel during a second pass. The sample values in the display buffer can be stored in a packed YUV format. The fragment shader routine can use to mask to control which sample values are written to the display buffer—only luma sample values in the first pass, and only chroma sample values in the second pass.

Using a shader routine to convert sample values from a YUV format to an RGB format (e.g., for an RGBa display bitmap). Such color space conversion operations can be performed in a subsequent pass of the fragment shader routine.

Using a shader routine to perform one or more decoding operations in conjunction with rendering operations that use a graphics primitive (e.g., point sprite). When texture values are transform coefficients for an intra-coded block, the decoding operations can include residual reconstruction (inverse quantization and inverse frequency transform) as well as intra-picture prediction.

The various innovations can be used in combination or separately. For example, representing a set of intra-coded blocks (such as blocks of intra-coded MBs or intra-coded CUs) with point sprites facilitates the execution of shader routines (such as a vertex shader routine and fragment shader routine) by a GPU to perform decoding and/or merging operations in parallel for the entire set of intra-coded blocks. This can reduce GPU memory access operations and speed up the process of merging sample values in a planar format in GPU memory into a display buffer, which stores sample values in a packed format.

A. Examples of Intra-Coded Blocks

In block-based video coding/decoding, inter-picture prediction exploits temporal redundancy between neighboring pictures to reduce bit rate. For example, for a current block of a current picture, a video encoder finds a matching block in a previously encoded/reconstructed picture. The sample values of the matching block provide predicted values for the current block. In contrast, intra-picture prediction exploits spatial redundancy within a given picture to reduce bit rate. For example, for a current block of a current picture, a video encoder uses reconstructed sample values of neighboring blocks within the current picture to predict the sample values of the current block. Whether intra-picture prediction or inter-picture prediction is used, the video encoder can encode the differences (residual values) between the sample values of the current block and predicted values for the current block.

In some example implementations, units (e.g., MBs, CUs) can be encoded using intra-picture prediction (resulting in intra-coded blocks) or inter-picture prediction (resulting in inter-coded blocks). For intra-picture prediction, intra-coded blocks can use reconstructed sample values from neighboring blocks that have been encoded using intra-picture prediction or from neighboring blocks that have been encoded inter-picture prediction. FIG. 8a shows an example (800) of intra-coded blocks that may have dependencies on adjacent inter-coded blocks or adjacent intra-coded blocks. In FIG. 8a, an arrow indicates a dependency of an intra-coded block on another block that provides reconstructed sample values for intra-picture prediction. Some intra-coded blocks in FIG. 8a are dependent on adjacent inter-coded blocks. Other intra-coded blocks in FIG. 8a are dependent on adjacent intra-coded blocks.

Alternatively, intra-coded blocks (e.g., blocks of intra-coded MBs or CUs) are allowed to use reconstructed sample values only from neighboring blocks that have been encoded using intra-picture prediction. FIG. 8b shows an example (810) of intra-coded blocks that may not have dependencies on adjacent inter-coded blocks. None of the intra-coded blocks of FIG. 8b is dependent on an adjacent inter-coded block. A flag in the bitstream of encoded data can indicate whether intra-picture prediction is constrained to use only reconstructed sample values from intra-coded blocks. In the H.264 standard, for example, the syntax element constrained_intra_pred_flag indicates whether intra-picture prediction is constrained to use only reconstructed sample values from intra-coded MBs. When the constraint flag is set, spatial intra prediction for an intra-coded block cannot use reconstructed sample values from inter-coded blocks.

When intra-picture prediction is constrained to use only reconstructed sample values from intra-coded blocks, decoding of inter-coded blocks can happen in parallel with decoding of intra-coded blocks, since no intra-coded blocks are dependent on reconstructed sample values of the inter-coded blocks. This tends to reduce overall latency, since decoding is faster. Further, intra-coded blocks in distinct regions, with no dependencies on other intra-coded blocks, can be decoded in parallel. In some example implementations, intra-picture prediction is constrained to use only reconstructed sample values from intra-coded blocks. Alternatively, intra-coded blocks are not constrained to use only sample values from other intra-coded blocks during decoding.

Figure 9:
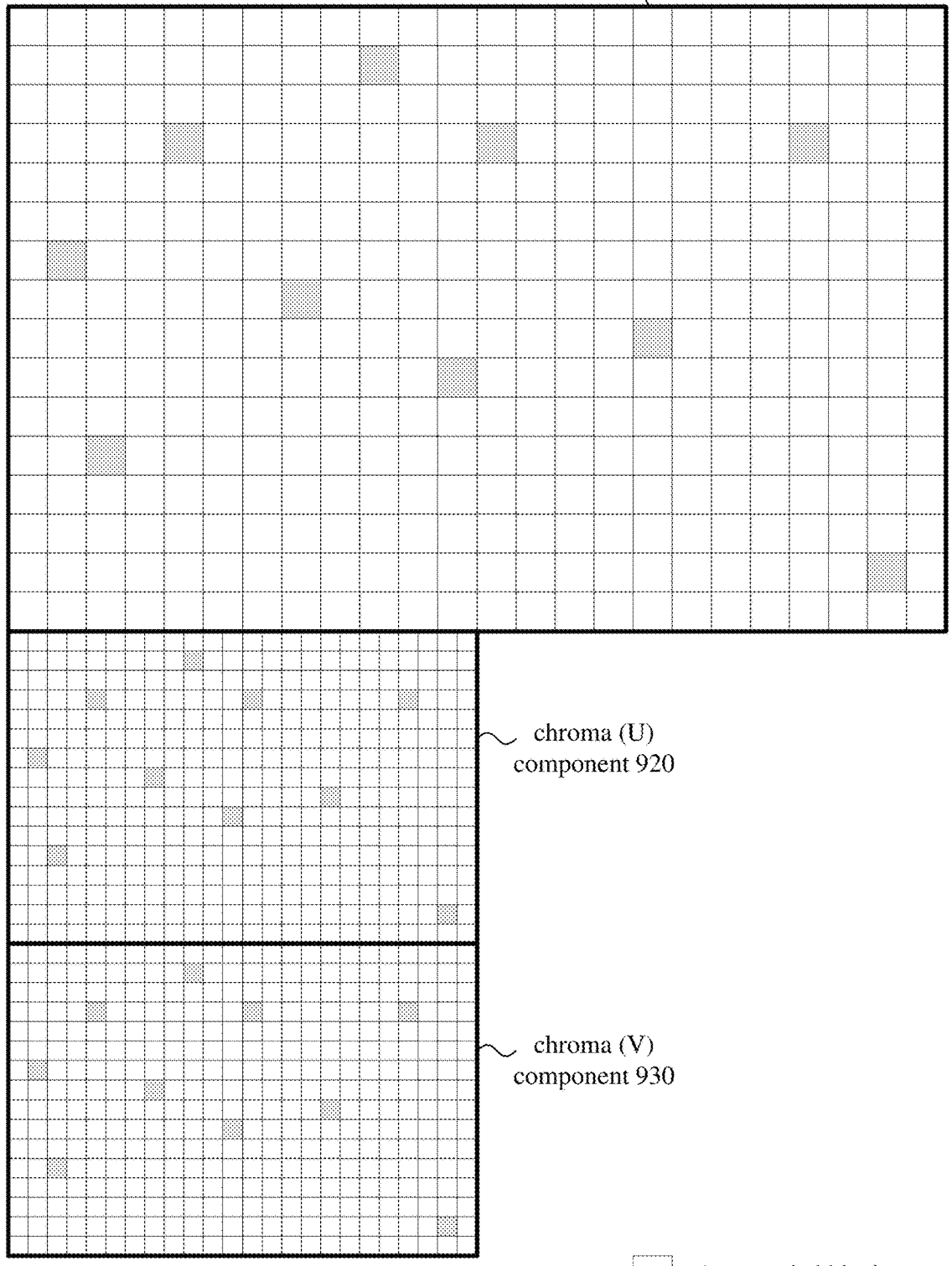
FIG. 9 is a diagram illustrating an example of sparse intra-coded blocks of a picture.

In most video codec standards and formats, a given picture can include a mix of inter-coded blocks and intra-coded blocks. This may be the case, for example, when inter-picture prediction is successful for most areas of a current picture (e.g., due to predictable motion or absence of motion in those areas), but fails for a few areas of the current picture (e.g., due to a new object appearing or complex motion). In many scenarios, even when a picture includes a mix of inter-coded blocks and intra-coded blocks, the intra-coded blocks are relatively few in number and are scattered throughout the picture. FIG. 9 shows an example (900) of sparse intra-coded blocks of a picture. In the example (900) of FIG. 9, intra-coded blocks are shown as shaded blocks, and inter-coded blocks are shown as non-shaded blocks. The sample values of the blocks are in a planar format. The sample values of the luma (Y) component (910), first chroma (U) component (920), and second chroma (V) component are in separate arrays. Some of the innovations described herein can be used for intra-coded blocks or inter-coded blocks, but provide more noticeable performance improvements when used for intra-coded blocks that sparsely populate a picture.

B. Aggregating Texture Values in CPU Memory for Transfer to GPU Memory.

In one approach to GPU-accelerated decoding, texture values for intra-coded blocks that sparsely populate a picture are serially copied, one block after another, from CPU memory to GPU memory, directly into a buffer. One problem with this approach is that it involves inefficient, serial transfer operations of texture values for individual intra-coded blocks. Transferring texture values from CPU memory to GPU memory can be a relatively expensive operation. Another problem is that GPU memory efficiency can be very low for this approach. For example, for a picture with high spatial resolution, in which relatively few blocks are intra-coded blocks, the approach can result in allocation of a large memory block (the size of a picture buffer), so as to guard against the possibility of a large number of intra-coded blocks in the picture, with most of the large memory block not being used to store texture values.

Figure 10:
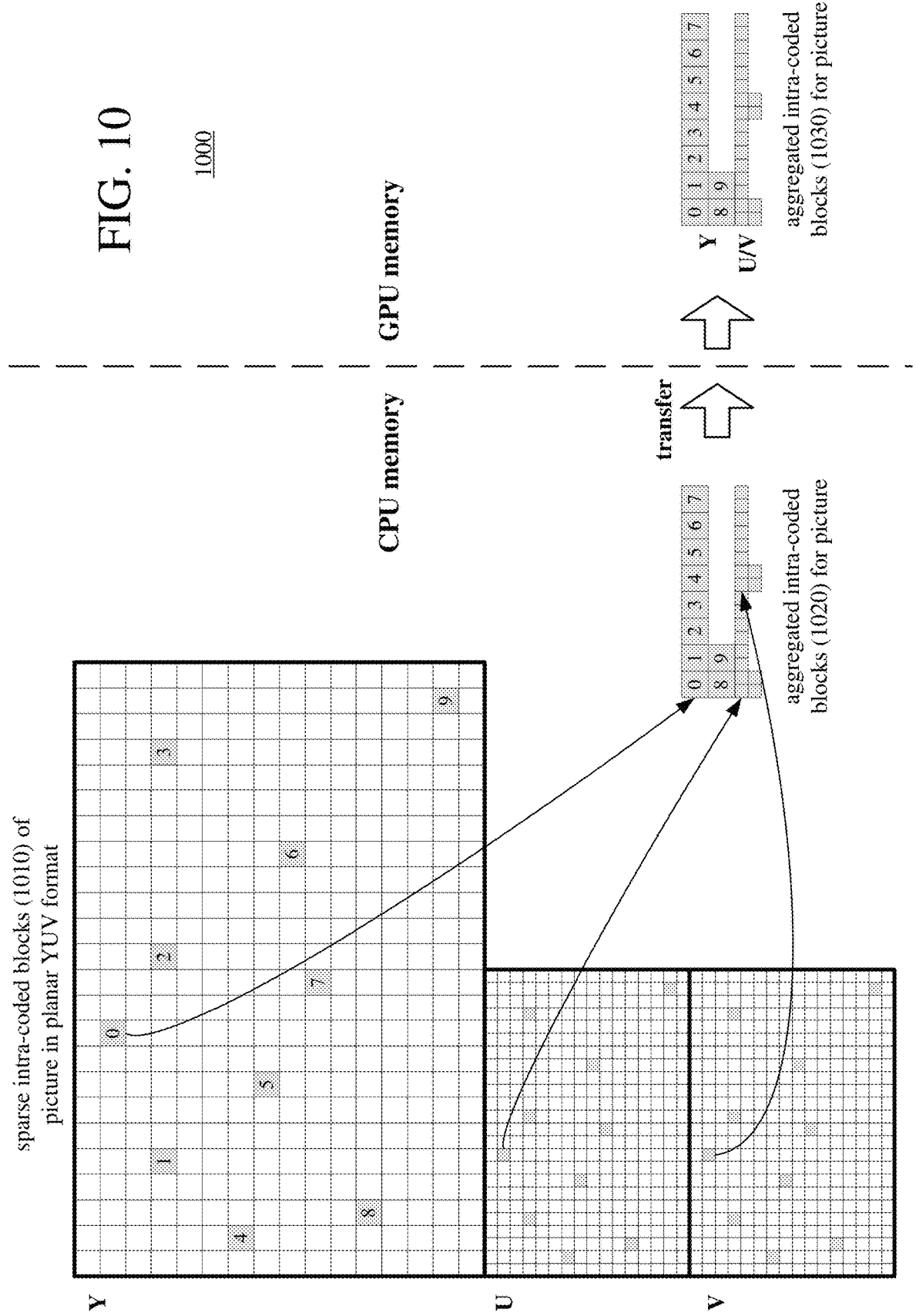
FIG. 10 is a diagram illustrating an example of transferring aggregated texture values for multiple intra-coded blocks from CPU memory to GPU memory.

According to approaches described in this section, texture values for blocks are aggregated in CPU memory for transfer to GPU memory. FIG. 10 illustrates an example (1000) of transferring aggregated texture values for multiple intra-coded blocks from CPU memory to GPU memory. In the example (1000) of FIG. 10, texture values for sparse intra-coded blocks (1010) of a picture in a planar YUV format are initially stored in three arrays in CPU memory, which is memory accessible to a CPU. The luma (Y) component includes ten intra-coded blocks for ten intra-coded units. Each chroma (U, V) component includes ten intra-coded blocks for those intra-coded units. The chroma (U, V) components are downsampled by a factor of two horizontally and vertically. For example, each intra-coded block of the luma component is a 16×16 block, and each intra-coded block of the chroma components is an 8×8 block. Each intra-coded block of a chroma component is collocated, compared to the corresponding block in the luma component, after accounting for downsampling. The number of intra-coded blocks is relatively small (10 out of 384 blocks per component), and the intra-coded blocks are scattered throughout the picture. Separately transferring individual intra-coded blocks could involve 30 transfer operations, and could result in inefficient allocation of GPU memory to store the texture values for the scattered intra-coded blocks.

Instead, as shown in FIG. 10, texture values for the intra-coded blocks (1020) are aggregated in CPU memory. Texture values for the aggregated intra-coded blocks (1020), at least per color component, are packed together into contiguous memory locations in CPU memory. That is, texture values for the sparse intra-coded blocks of the luma component are packed together in CPU memory. Similarly, texture values for the sparse intra-coded blocks of the first chroma (U) component are packed together in CPU memory, and texture values for the sparse intra-coded blocks of the second chroma (V) component are packed together in CPU memory. The packed texture values for a given color component can be contiguous with, or separated from, the packed texture values for the other color components. An offset value can indicate an offset in CPU memory from the start of texture values for the luma component to the start of texture values for a chroma component.

The texture values for the aggregated intra-coded blocks (1020) are transferred to GPU memory, which is memory accessible by a GPU. In GPU memory, the intra-coded blocks (1030) are stored as an aggregate. An offset value can indicate an offset in GPU memory from the start of texture values for the luma component to the start of texture values for a chroma component.

For a given block, the texture values transferred from CPU memory to GPU memory can be sample values or transform coefficients. In some example implementations, both types of texture values (sample values and transform coefficients) can be transferred from CPU memory to GPU memory in a single pass for different blocks of a picture. In this case, a flag value per block can indicate whether the texture values for that block are sample values or transform coefficients. Alternatively, different types of texture values can be transferred from CPU memory to GPU memory in different passes.

In some example implementations, when texture values for an intra-coded block are transferred, if the intra-coded block is a single, isolated intra-coded block, transform coefficients for the intra-coded block are transferred from CPU memory to GPU memory. In this case, decoding operations such an inverse frequency transform and intra-picture prediction are performed by the GPU after the transfer in order to reconstruct sample values for the given block. Otherwise, if the intra-coded block depends on one or more other intra-coded blocks, or has one or more other intra-coded blocks dependent on it, sample values for the intra-coded block are transferred from CPU memory to GPU memory. In this case, decoding operations such an inverse frequency transform and intra-picture prediction are performed by the CPU before the transfer.

As shown in FIG. 10, texture values for a luma component of a picture can be transferred from CPU memory to GPU memory in the same pass as texture values for chroma components of the picture. In this case, one or more chroma offset values can indicate the location at which texture values for chroma components begin in GPU memory. Alternatively, texture values for the luma component and texture values for the chroma components can be transferred from CPU memory to GPU memory in different passes. Or, as another alternative, texture values for each color component can be transferred from CPU memory to GPU memory in a separate pass.

Figure 11:
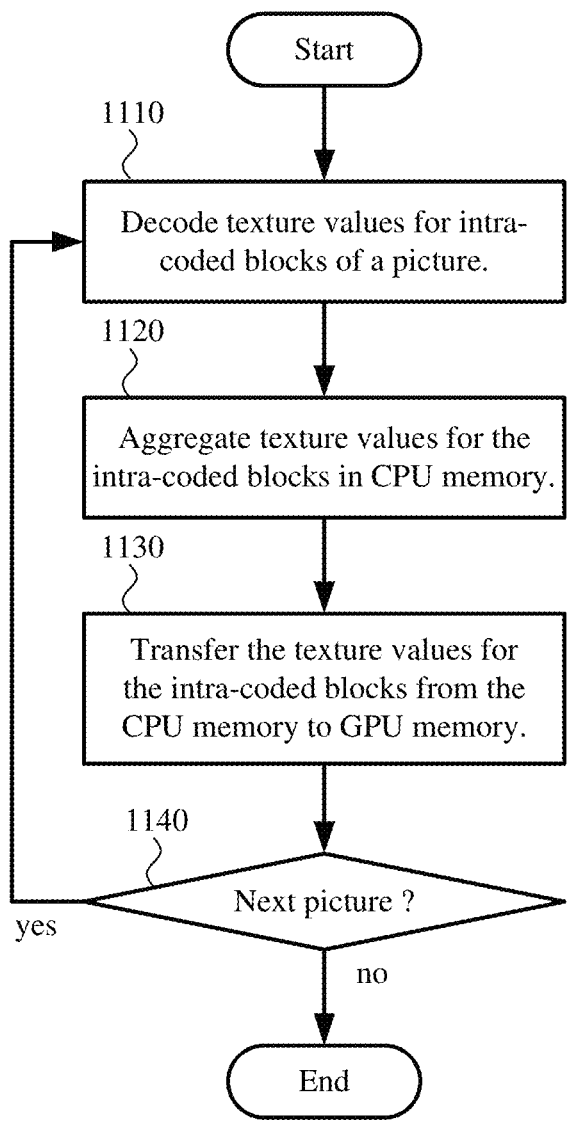
FIG. 11 is a flowchart illustrating a generalized technique for transferring aggregated texture values for multiple intra-coded blocks from CPU memory to GPU memory.

FIG. 11 shows a generalized technique (1100) for transferring aggregated texture values for multiple intra-coded blocks from CPU memory to GPU memory. The technique (1100) is performed by a video playback tool that includes a video decoder system, such as the video decoder system (400) described with reference to FIG. 4. The video decoder system can include one or more decoding routines executable in a browser environment running on a CPU, as well as one or more shader routines executable by a GPU. The decoding routine(s) executable in the browser environment and shader routine(s) executable by the GPU can be downloaded to the browser environment from a server, then executed locally.

To start, the video playback tool decodes (1110) texture values for multiple intra-coded blocks of a picture. A given block of the multiple intra-coded blocks can be a part of a MB, part of a CU, or part of some other unit of video. For a given block, the texture values can be sample values or transform coefficients. For example, with a CPU, a video decoder system performs entropy decoding operations to reconstruct quantized transform coefficients, which are aggregated in CPU memory for transfer to GPU memory. Or, with a CPU, the video decoder system performs entropy decoding operations and inverse quantization operations to reconstruct de-quantized transform coefficients, which are aggregated in CPU memory for transfer to GPU memory. Or, with a CPU, the video decoder system performs entropy decoding operations, inverse quantization operations, intra-picture prediction operations, and combination operations to reconstruct sample values, which are aggregated in CPU memory for transfer to GPU memory.

The video playback tool aggregates (1120) the texture values for the multiple intra-coded blocks in CPU memory. Then, the video playback tool transfers (1130) the texture values for the intra-coded blocks from the CPU memory to GPU memory. The texture values for the intra-coded blocks are also aggregated in the GPU memory. Collectively, the texture values for the blocks can be (a) sample values of the blocks, respectively, (b) transform coefficients for the blocks, respectively, or (c) sample values for one or more of the blocks, respectively, and transform coefficients for one or more of the blocks, respectively. Typically, the texture values in CPU memory and texture values in GPU memory are in a planar color component format (e.g., planar YUV format).

The video playback tool checks (1140) whether to continue with decoding for the next picture and, if so, decodes (1110) texture values for intra-coded blocks of the next picture. For the sake of simplicity, FIG. 11 does not show other aspects of decoding (e.g., operations in the GPU, operations for inter-coded blocks).

In the examples of FIGS. 10 and 11, texture values for intra-coded blocks are aggregated for transfer from CPU memory to GPU memory. Alternatively, texture values for inter-coded blocks can be aggregated for transfer from CPU memory to GPU memory, or texture values for a collection of intra-coded blocks and inter-coded blocks can be aggregated for transfer from CPU memory to GPU memory.

C. Example Graphics Primitives and GPU Operations Using the Primitives.

According to approaches described in this section, texture values for a block are represented, with a graphics primitive, as a point for processing by a GPU. Such graphics primitives can be used to define texture values for certain types of blocks of a picture (e.g., intra-coded blocks). A single graphics primitive can represent, as a point, an 8×8 block, 16×16 block, or other size of block for operations by the GPU, which provides an efficient way to represent blocks in the graphics pipeline. In many cases, graphics primitives for multiple blocks can be processed in parallel (e.g., with shader routines executed by the GPU).

In some example implementations, the graphics primitive that represents, as a point, texture values for a given block is a point sprite. A point sprite is a generalization of generic point that enables an arbitrary shape to be rendered as defined by texture values associated with the point sprite. Point sprites are supported in WebGL, OpenGL, and other graphics APIs and architectures for GPU processing.

FIG. 12 shows an example (1200) of a graphics primitive (1210) that represents, as a point, texture values for a given block for processing by a GPU. In the example (1200) of FIG. 12, the given block is a luma block (shown as luma block 0). The graphics primitive (1210) includes multiple attributes.

The first attribute ("id") is an identifier for the graphics primitive (1210). The identifier can be a GUID, object identifier, block identifier, or other identifier of the block whose texture values are represented by the graphics primitive (1210). Alternatively, graphics primitives can be stored in an array, in which case the index value of a given graphics primitive in the array can be used to identify that graphics primitive, and the number of graphics primitives (or blocks) is tracked.

In the example (1200) of FIG. 12, the second attribute is a block size for the graphics primitive (1210). In FIG. 12, the block size is 16×16. The graphics primitive (1210) represents luma texture values for a 16×16 block of the picture. Alternatively, the block size can have another value, such as 8×8 for H.264 coding/decoding (e.g., for a block of chroma sample values that is collocated with a 16×16 block of luma sample values), or 4×4, 8×8, 32×32, or 64×64 for a block of a CU for H.265 coding/decoding. Alternatively, the block size can have some other arbitrary value.

In FIG. 12, the third attribute of the graphics primitive (1210) is a packed index value. The packed index value is a reference (such as a pointer, memory address, or (x, y) coordinates) to the location of texture values in GPU memory for the block represented by the graphics primitive (1210). For example, for the block Y0 (luma block 0), the packed index value references the GPU memory position that stores texture value for luma block 0, among the texture values of the aggregated intra-coded blocks (1030) for the picture in GPU memory.

The fourth attribute of the graphics primitive (1210) is a display index value. The display index value is a reference (such as a pointer, memory address, or (x, y) coordinates) to the location of texture values in a display buffer (1290) for the block represented by the graphics primitive (1210). In FIG. 12, the display index value references the position for luma block 0 in the display buffer (1290). Reconstructed sample values for luma block 0 will be written at that position in the display buffer (1290). The position indicated in the display buffer (1290) can be the same as the position of another buffer in CPU memory or GPU memory (e.g., storing texture values for a luma block) during an earlier stage of decoding.

Alternatively, instead of having a packed index value that indicates the location of texture values in GPU memory for a block, a graphics primitive can have, as an attribute, the texture values themselves. For example, the graphics primitive stores, as one of its attributes, an array of texture values for an 8×8 block, 16×16 block, or other size of block.

A graphics primitive can include other and/or additional attributes. For example, an attribute of the graphics primitive can indicate a shape for the point (e.g., rectangle, square, circle). In some example implementations, the shape of the point is square. Or, the attributes can include one or more parameters not used in the decoding process. For example, the attributes include a parameter that triggers processing of graphics primitives by the GPU. In some example implementations, the parameter is a lighting parameter normally used for fog or other special effects, which triggers processing of the graphics primitives by the GPU to blend the texture values represented by the graphics primitives with other values (e.g., blending residual values with predicted values in the GPU, or other addition/blending operations).

Figure 13A:
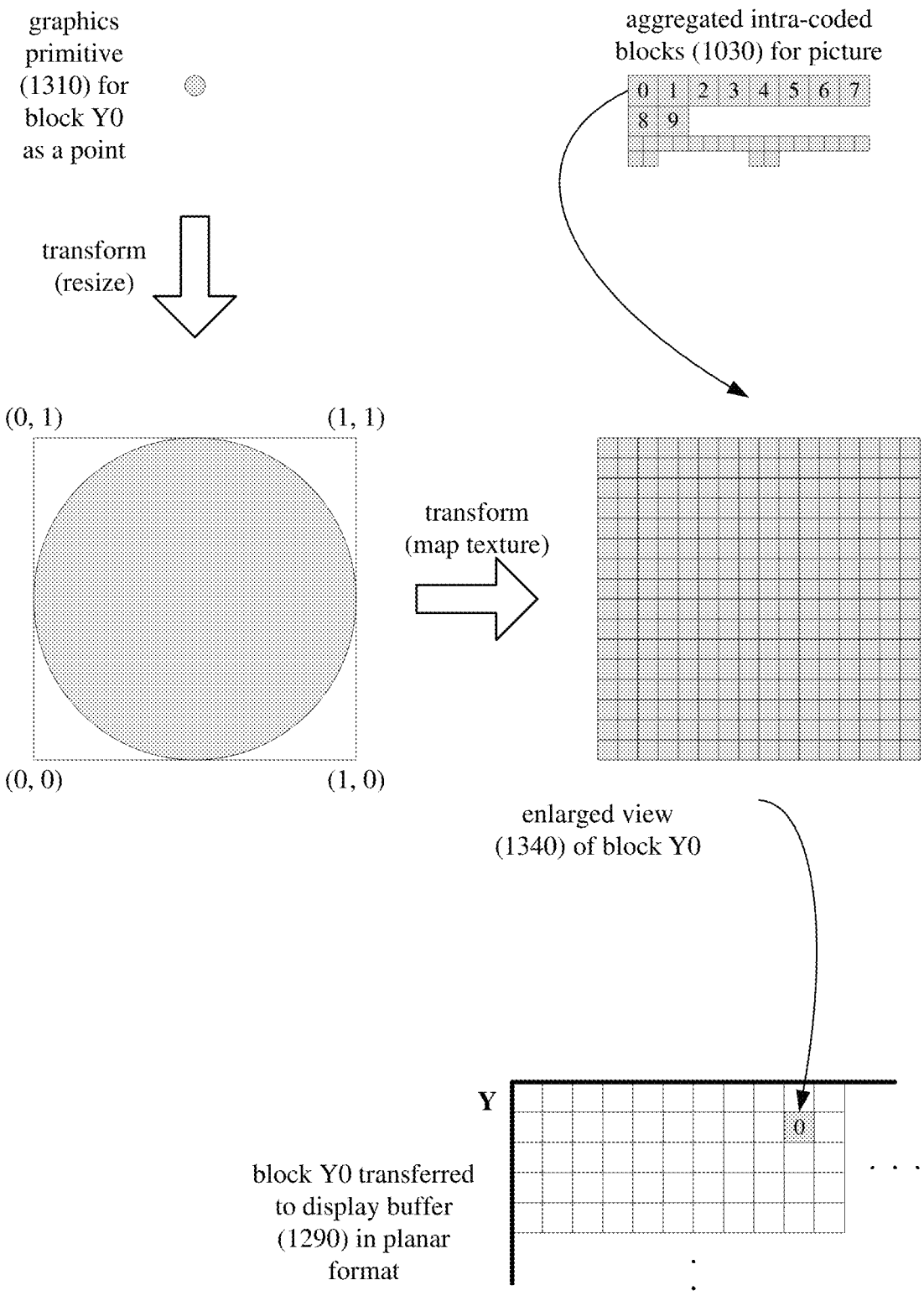
FIGS. 13a and 13b are diagrams illustrating examples of transfer of texture values, represented by a graphics primitive, from GPU memory to a display buffer.
Figure 13B:
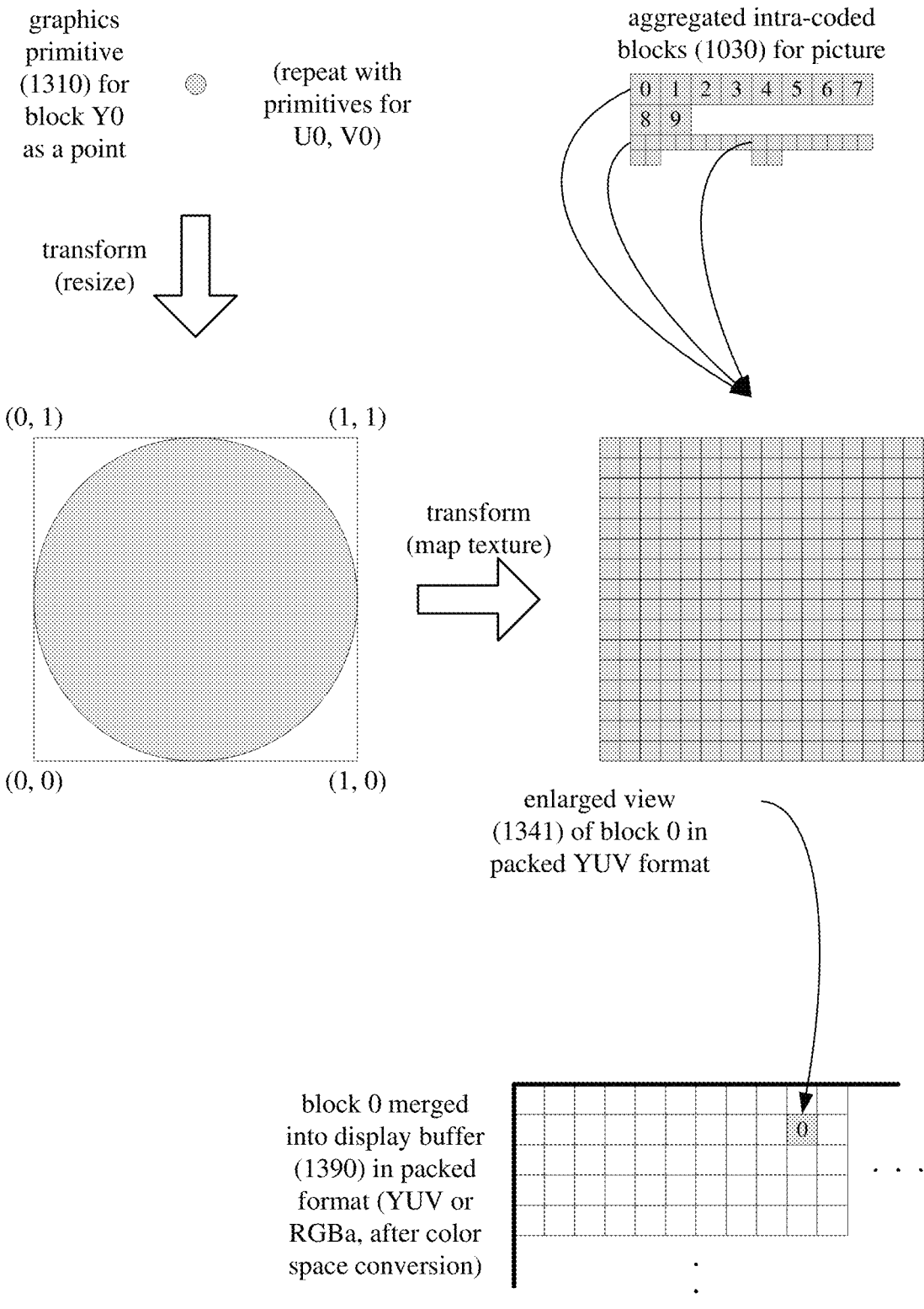

FIGS. 13a and 13b illustrate examples of transfer of texture values, represented by graphics primitives, from GPU memory to a display buffer for intra-coded blocks of a picture. The transfers are part of GPU rendering operations, which can be performed using one or more shader routines. Although FIGS. 13a and 13b illustrate operations for a single block (FIG. 13a) or multiple collocated blocks of a single unit (FIG. 13b), the operations can be performed in parallel for different units.

In the example (1300) of FIG. 13a, a graphics primitive (1310) represents texture values for block Y0 as a point. During rendering operations in the GPU, the point is transformed by resizing it to the block size (and shape) indicated for the point in the graphics primitive (1310). Then, the resized point is further transformed by mapping texture values to it, using the packed index value of the graphics primitive (1310) to locate the texture values associated with the point in GPU memory. The texture values in GPU memory are part of the texture values for the aggregated intra-coded blocks (1030) for the picture, which are in a planar YUV 4:2:0 format in FIG. 13a. FIG. 13a shows an enlarged view (1340) of the sample values for block Y0, after the transforms. The sample values for block Y0 are transferred to the display buffer (1290), using the display index value of the graphics primitive (1310) to locate the appropriate positions in the display buffer (1290). In FIG. 13a, the display buffer is in a planar YUV format, including separate arrays for different color components.

In the example (1301) of FIG. 13b, GPU rendering operations incorporate chroma upsampling. A graphics primitive (1310) represents texture values for block Y0 as a point, and two other graphics primitives (1310) represent texture values for blocks U0 and V0, respectively, as points. During rendering operations in the GPU, each of the three points is transformed by resizing it to the block size (and shape) indicated for the point in the graphics primitive (1310) (that is, a 16×16 arrangement of values for the luma block, and an 8×8 arrangement of values for each of the two chroma blocks). For each of the three graphics primitives (1310), the resized point is further transformed by mapping texture values to it, using the packed index value of the graphics primitive (1310) to locate the texture values associated with the point in GPU memory. Sample values for the two 8×8 chroma blocks are upsampled by a factor of 2 horizontally and vertically. FIG. 13b shows an enlarged view (1341) of the sample values for block 0 in a packed YUV 4:4:4 format, including a Y sample value, U sample value, and V sample value per pixel. The sample values for block 0 are merged into the display buffer (1390), using the display index values of the graphics primitives (1310) to locate the appropriate positions in the display buffer (1390). The sample values in the display buffer (1390) can be in a packed YUV 4:4:4 format or, after color space conversion operations, a packed RGB format or packed RGBa format.

In the examples of FIGS. 12, 13a, and 13b, a graphics primitive (e.g., point sprite) represents texture values for a block. There is a 1:1 ratio between graphics primitives and blocks whose texture values are represented by the graphics primitives. Alternatively, a given graphics primitive (e.g., point sprite) can represent texture values for a single unit that includes multiple blocks (e.g., for a MB or CU). In this case, for example, the graphics primitive can include multiple block size attributes (one block size attribute per block), multiple packed index attributes or texture arrays (one packed index attribute or texture array per block), and one or more display index attributes.

FIG. 14 shows a generalized technique (1400) for video decoding and rendering in which a graphics primitive represents texture values for a given block as a point for processing by a GPU. The technique (1400) is performed by a video playback tool that includes a video decoder system, such as the video decoder system (400) described with reference to FIG. 4. The video decoder system can include one or more decoding routines executable in a browser environment running on a CPU, as well as one or more shader routines executable by a GPU. The decoding routine(s) executable in the browser environment and shader routine(s) executable by the GPU can be downloaded to the browser environment from a server, then executed locally.

The video playback tool receives (1410) encoded data for a picture. The video playback tool can store the encoded data in a buffer (e.g., a coded data buffer, in CPU memory, configured to store the encoded data). The video playback tool performs (1420) operations to decode the encoded data and reconstruct the picture. For example, the video playback tool includes a video decoder system configured to perform the operations. In performing the operations, for a given block of multiple blocks of the picture, a graphics primitive represents texture values for the given block as a point for processing by a GPU. The given block can be an intra-coded block or inter-coded block. The block can be part of a MB, part of a CU, or part of some other unit of video. The texture values for the given block can be sample values of the given block or transform coefficients for the given block.

The video playback tool checks (1430) whether to continue with decoding for the next picture and, if so, receives (1410) encoded data for the next picture. For the sake of simplicity, FIG. 14 does not show other aspects of decoding.

In some example implementations, the graphics primitive that represents texture values for a given block is a point sprite. Alternatively, the graphics primitive is some other type of graphics primitive. Examples of graphics primitives are described with reference to FIG. 12. The graphics primitive that represents texture values for a given block can have multiple attributes. The multiple attributes can include a block size (indicating block size for the given block), a display index value (indicating the location of the texture values for the given block in a display buffer), and/or a packed index value (indicating the location of the texture values for the given block in a texture buffer in GPU memory). Instead of having a packed index value, the graphics primitive can include, as an attribute, the texture values themselves. Examples of attributes of graphics primitives are described with reference to FIG. 12.

D. Example Shader Routines.

According to approaches described in this section, one or more shader routines are executed in a GPU to transfer texture values from GPU memory to a display buffer. In some example implementations, the shader routines can also be used to perform one or more decoding operations on the texture values in GPU memory. The shader routines are highly parallelized, typically operating on multiple blocks in parallel.

Figure 15:
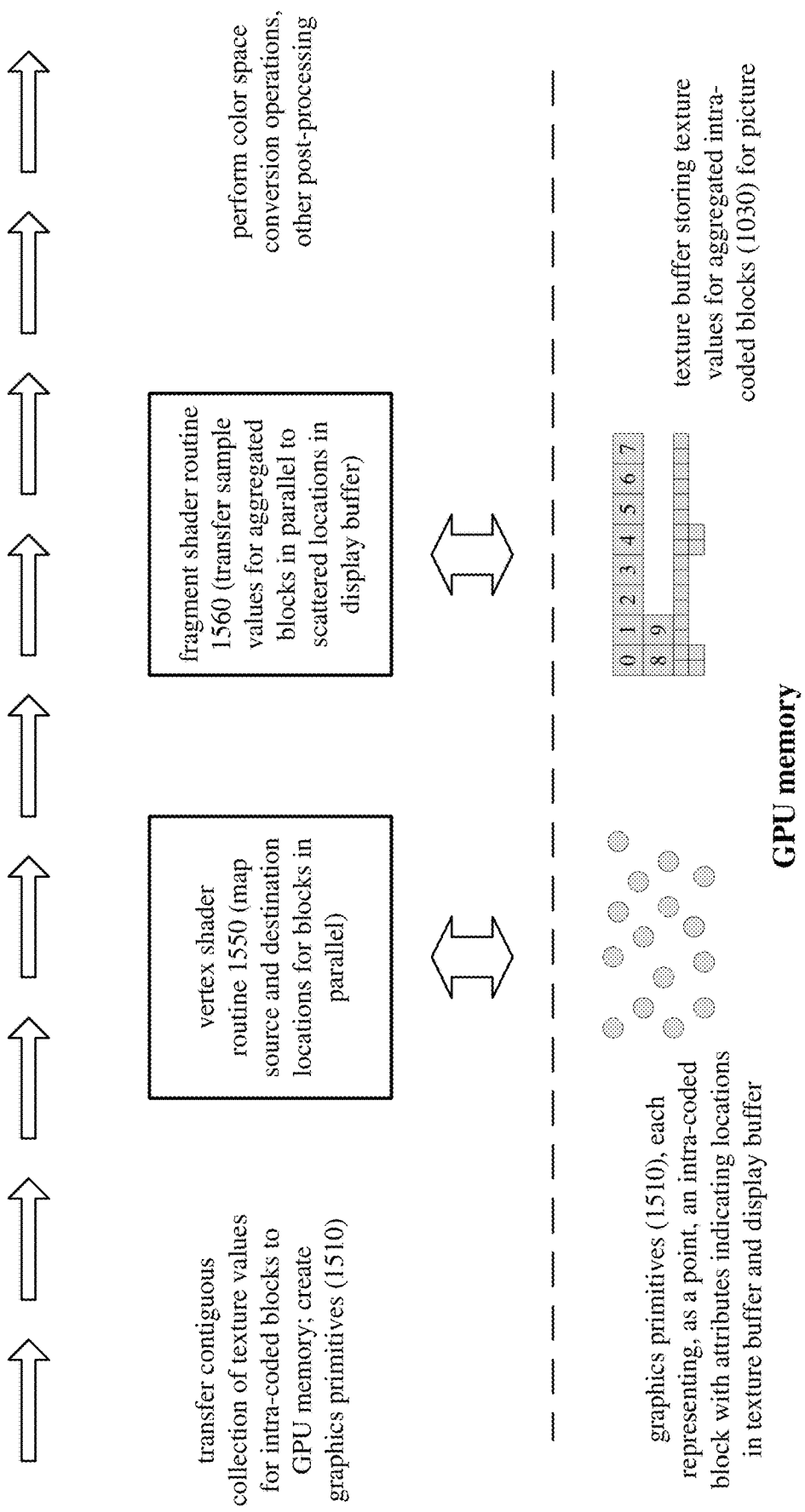
FIG. 15 is a diagram illustrating an example of shader routines transferring texture values from GPU memory to a display buffer.

FIG. 15 shows an example (1500) of shader routines transferring texture values for intra-coded blocks of a picture from GPU memory to a display buffer. To start, a texture buffer in GPU memory stores a contiguous collection of texture values for intra-coded blocks (1030) of a picture (e.g., sample values and/or transform coefficients for sparse intra-coded blocks of the picture). For example, the texture values were previously aggregated in CPU memory then transferred to GPU memory, as described above in section V.B. The texture buffer in GPU memory is accessible to the shader routines.

A set of graphics primitives (1510) is created in GPU memory to represent the texture values for the multiple intra-coded blocks. For example, the graphics primitives are point sprites, as described above in section V.C. Each of the graphics primitives represents, as a point, an intra-coded block with attributes indicating a location in the texture buffer, a location in the display buffer, a block size, etc. The set of graphics primitives (1510) in GPU memory is accessible to the shader routines.

Conventionally, a GPU uses a vertex shader routine for rasterization. The vertex shader routine determines a position to which values will be rendered, and it determines how to perform the rendering. In FIG. 15, a GPU executes a vertex shader routine (1550) to map source locations (in the texture buffer) to destination locations (in the display buffer) for multiple blocks in parallel. With the vertex shader routine (1550), the GPU processes multiple graphics primitives (1510) in parallel. For example, the vertex shader routine (1550) finds coordinates in the display buffer for all of the intra-coded blocks (1030) in parallel. The vertex shader routine (1550) can use the packed index attributes of the respective graphics primitives (1510) to find the locations of texture values in the texture buffer, and it can use the display index attributes of the respective graphics primitives (1510) to find the locations in the display buffer. The vertex shader routine (1550) can use the block size attributes of the respective graphics primitives (1510) when setting up coordinates in the display buffer to which sample values will be transferred. Thus, the vertex shader routine (1550) prepares for sample values of intra-coded blocks to be merged into a destination bitmap in the display buffer.

Conventionally, a GPU uses a fragment shader routine (also called a pixel shader routine) to perform actual rendering operations. In FIG. 15, a GPU executes a fragment shader routine (1560) to transfer texture values for aggregated blocks in parallel to scattered locations in a display buffer. With the fragment shader routine (1560), the GPU processes multiple graphics primitives (1510) in parallel. For example, the fragment shader routine (1560) loads texture values for all intra-coded blocks in parallel. The fragment shader routine (1560) can use block size attributes and display index attributes of the respective graphics primitives (1510) when transferring sample values to the appropriate coordinates in the display buffer.

The fragment shader routine (1560) can transfer texture values for the intra-coded blocks in multiple passes. For example, the fragment shader routine (1560) loads texture values for all luma blocks in parallel in first pass, and it loads texture values for all chroma blocks in parallel in a second pass. When merging sample values into a display buffer in a packed YUV format, the fragment shader routine (1560) can use a color mask to control which sample values are updated in the two passes. In some example implementations, the color mask has four control parameters a, b, c, d for four sample values of a pixel in the display buffer. In the first pass, the color mask is ColorMask(1, 0, 0, 0), which enables writing of sample values at luma positions of pixels (but leaves values at chroma positions unchanged). In the second pass, the color mask is ColorMask(0, 1, 1, 0), which enables writing of sample values at chroma positions of the pixels (without overwriting the luma sample values that were written in the first pass).

With one or more shader routines (e.g., the fragment shader routine (1560)), the GPU can also perform chroma upsampling when transferring texture values for chroma blocks. Chroma sample values can simply be doubled horizontally and vertically to recover 4:4:4 video from 4:2:0 video. Alternatively, a shader routine can alternate chroma sample values in the display buffer, then use bilinear filtering or another lowpass filter on the chroma sample values for post-processing. Or, chroma sample values can be repeated or filtered in some other way as appropriate for some other rate of chroma upsampling.

In this way, luma sample values and chroma sample values for the respective positions can be merged into a packed YUV format. Using the luma sample values and chroma sample values, the GPU can execute one or more shader routines (e.g., the fragment shader routine (1560)) to perform color space conversion and/or other post processing operations. For example, values in a packed YUV format are converted to values in a packed RGB format or packed RGBa format. In the example (1500) of FIG. 15, the overall transformation is from a YUV planar format (different, separate planes of texture values for different color components) into a YUV packed format (one plane of sample values, with Y, U, and V samples values for a given position being adjacent) into an RGB packed format (after color space conversion, R, G, and B sample values, and perhaps an opacity value, for a given position being adjacent). Alternatively, the transformation is from a YUV planar format directly into an RGB or RGBa packed format.

In some example implementations, the GPU can also execute one or more shader routines (e.g., the fragment shader routine (1560)) to perform decoding operations for the multiple intra-coded blocks. With a given shader routine, the GPU processes multiple graphics primitives (1510) in parallel. The decoding operations can proceed in multiple passes in the graphics pipeline. For example, the GPU can execute one or more shader routines to perform:

in a first rendering pass, inverse transform operations on transform coefficients to reconstruct residual values;

in a second rendering pass, intra-picture prediction operations to determine predicted values and combination operations to blend the predicted values and residual values;

in a third rendering pass, deblock filtering operations, dering filtering operations, and other filtering operations on reconstructed sample values; and in a fourth rendering pass, chroma upsampling operations and color space conversion operations.

FIG. 16 shows a generalized technique (1600) for video decoding and rendering in which shader routines transfer sample values from GPU memory to a display buffer. The technique (1600) is performed by a video playback tool that includes a video decoder system, such as the video decoder system (400) described with reference to FIG. 4. The video decoder system can include one or more decoding routines executable in a browser environment running on a CPU, as well as one or more shader routines executable by a GPU. The decoding routine(s) executable in the browser environment and shader routine(s) executable by the GPU can be downloaded to the browser environment from a server, then executed locally.

The video playback tool stores (1610), in GPU memory, texture values for multiple intra-coded blocks of a picture. For a given one of the intra-coded blocks, a graphics primitive can represent texture values for the given block as a point for processing by the GPU. The texture values can be sample values or transform coefficients.

With a first shader routine, the video playback tool determines (1620), in parallel, locations in a display buffer for the multiple blocks, respectively. For example, the first shader routine is a vertex shader routine, which can be used to determine, in parallel, locations in the display buffer for the multiple blocks.

With a second shader routine, the video playback tool transfers (1630), in parallel, sample values of the multiple blocks, respectively, to the display buffer. For example, the second shader routine is a fragment shader routine, which can be used to transfer, in parallel, sample values of the multiple blocks, respectively, to the display buffer. The transfer of sample values to the display buffer can be performed in multiple passes. For example, the multiple passes include a first pass for transferring luma sample values of the multiple intra-coded blocks, respectively, and a second pass for transferring chroma sample values of the multiple intra-coded blocks, respectively. A bit mask can control which of the sample values of the multiple blocks are written to the display buffer in the multiple passes, respectively.

Optionally, before transferring sample values to the display buffer, with the second shader routine (or another shader routine), the video playback tool performs one or more decoding operations on texture values. For example, the texture values for a given intra-coded block are transform coefficients for the given block, and the decoding operations include one or more of: (a) inverse frequency transform operations on the transform coefficients for the given block to reconstruct residual values for the given block; (b) intra-picture prediction operations to determine predicted values for the given block; (c) combination operations to combine the residual values for the given block with the predicted values for the given block, thereby reconstructing sample values of the given block; (d) filtering operations to selectively filter boundaries of the given block; and (e) chroma upsampling operations and/or color space conversion operations using the sample values of the given block. Or, as another example, the texture values for a given intra-coded block are sample values of the given block, and the decoding operations include one or more of: (a) filtering operations to selectively filter boundaries of the given block; and (b) chroma upsampling operations and/or color space conversion operations using the sample values of the given block.

The video playback tool checks (1640) whether to continue with decoding for the next picture and, if so, stores (1610) texture values for multiple intra-coded blocks of the next picture. For the sake of simplicity, FIG. 16 does not show other aspects of decoding.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system that implements a video playback tool comprising:

a buffer configured to store encoded data for a picture; and a video decoder system configured to perform operations to decode the encoded data and reconstruct the picture, wherein, for a given block of multiple blocks of the picture, a graphics primitive represents texture values for the given block as a point for processing by a graphics processing unit ("GPU") during video decoding, and wherein the given block is an intra-coded block having been encoded using intra-picture prediction, the operations including, for the given block:

associating the texture values for the given block with the graphics primitive for use in the video decoding, wherein the associating the texture values for the given block with the graphics primitive includes storing, as an attribute of the graphics primitive:

a reference to a location of the texture values for the given block; or the texture values for the given block; and using, as part of the video decoding, the graphics primitive to locate the texture values for the given block.

2. The computer system of claim 1, wherein the graphics primitive is a point sprite.

3. The computer system of claim 1, wherein the graphics primitive has multiple attributes, the multiple attributes including:

a block size for the given block;

a display index value that indicates location of the given block in a display buffer; and the reference or the texture values for the given block, the reference indicating the location of the texture values for the given block in a texture buffer in GPU memory.

4. The computer system of claim 1, wherein the given block is a part of a macroblock or part of a coding unit.

5. The computer system of claim 1, wherein the texture values for the given block are transform coefficients for the given block, and wherein the operations further comprise, for the given block, with one or more shader routines as part of the video decoding:
  inverse frequency transform operations on the transform coefficients for the given block to reconstruct residual values for the given block;
  intra-picture prediction operations to determine predicted values for the given block;
  combination operations to combine the residual values for the given block with the predicted values for the given block, thereby reconstructing sample values of the given block;
  filtering operations to selectively filter boundaries of the given block; and
  chroma upsampling operations and/or color space conversion operations using the sample values of the given block.

6. The computer system of claim 1, wherein the texture values for the given block are sample values of the given block, and wherein the operations further comprise, for the given block, with one or more shader routines as part of the video decoding:
  filtering operations to selectively filter boundaries of the given block; and
  chroma upsampling operations and/or color space conversion operations using the sample values of the given block.

7. The computer system of claim 1, wherein the multiple blocks are intra-coded blocks having been encoded using intra-picture prediction, and wherein the operations further comprise:
  aggregating texture values for the multiple blocks in central processing unit ("CPU") memory; and
  transferring the texture values for the multiple blocks from the CPU memory to GPU memory, wherein the texture values for the multiple blocks are aggregated in the GPU memory.

8. The computer system of claim 1, wherein the operations further comprise:
  with a vertex shader routine, determining, in parallel, locations in a display buffer for the multiple blocks, respectively.

9. The computer system of claim 1, wherein the operations further comprise:
  with a fragment shader routine, transferring, in parallel, sample values of the multiple blocks, respectively, to a display buffer.

10. The computer system of claim 9, wherein the transferring to the display buffer is performed in multiple passes, the multiple passes including a first pass for transferring luma sample values of the sample values of the multiple blocks, respectively, and a second pass for transferring chroma sample values of the sample values of the multiple blocks, respectively.

11. The computer system of claim 10, wherein a bit mask controls which of the sample values of the multiple blocks are written to the display buffer in the multiple passes, respectively.

12. The computer system of claim 1, wherein texture values for the multiple blocks in CPU memory are in a planar color component format, and wherein the operations further comprise:
  with one or more shader routines, transferring, in parallel, sample values of the multiple blocks, respectively, to a display buffer, wherein the sample values in the display buffer are in a packed color component format.

13. The computer system of claim 1, wherein the video decoder system includes:
  one or more decoding routines executable in a browser environment running on a central processing unit; and
  one or more shader routines executable by the GPU.

14. The computer system of claim 1, wherein the texture values for the given block are:
  transform coefficients for residual values that represent differences between sample values of the given block and intra-picture-predicted values for the given block; or
  sample values of the given block.

15. One or more computer-readable media storing computer-executable instructions for causing a central processing unit ("CPU"), when programmed thereby, to perform operations comprising:
  decoding texture values for multiple intra-coded blocks of a picture, the multiple intra-coded blocks having been encoded using intra-picture prediction;
  aggregating the texture values for the multiple intra-coded blocks in CPU memory;
  transferring the texture values for the multiple intra-coded blocks from the CPU memory to graphics processing unit ("GPU") memory, wherein the texture values for the multiple intra-coded blocks are aggregated in the GPU memory;
  associating texture values for a given block, among the multiple intra-coded blocks, with a graphics primitive for use in video decoding, wherein the graphics primitive represents the texture values for the given block as a point for processing by a GPU during the video decoding, and wherein the associating the texture values for the given block with the graphics primitive includes storing, as an attribute of the graphics primitive:
    a reference to a location of the texture values for the given block; or
    the texture values for the given block; and
  using, as part of the video decoding, the graphics primitive to locate the texture values for the given block.

16. The one or more computer-readable media of claim 15, wherein, for the given block, the texture values are sample values of the given block or transform coefficients for residual values that represent differences between the sample values of the given block and intra-picture-predicted values for the given block.

17. The one or more computer-readable media of claim 15, wherein the graphics primitive has multiple attributes, the multiple attributes including:
  a block size for the given block;
  a display index value that indicates location of the given block in a display buffer; and
  the reference or the texture values for the given block, the reference indicating the location of the texture values for the given block in a texture buffer in the GPU memory.

18. In a computing device that includes a graphics processing unit ("GPU"), a method comprising:

storing, in GPU memory, texture values for multiple intra-coded blocks of a picture, the multiple intra-coded blocks having been encoded using intra-picture prediction;

with a first shader routine, determining, in parallel, locations in a display buffer for the multiple intra-coded blocks, respectively; and with a second shader routine, transferring, in parallel, sample values of the multiple intra-coded blocks, respectively, to the display buffer.

19. The method of claim 18, wherein the transferring to the display buffer is performed in multiple passes, the multiple passes including a first pass for transferring luma sample values of the sample values of the multiple intra-coded blocks, respectively, and a second pass for transferring chroma sample values of the sample values of the multiple intra-coded blocks, respectively.

20. The method of claim 18, wherein, for a given block of the multiple intra-coded blocks of the picture, a graphics primitive represents texture values for the given block as a point for processing by the GPU.

\* \* \* \* \*